United States Patent [19]

Jost

[11] Patent Number: 5,671,385
[45] Date of Patent: Sep. 23, 1997

[54] MEMORY SUBSYSTEM WITH DISK MESHING, CONTROLLER MESHING, AND EFFICIENT CACHE BUFFER LOOKUP

[75] Inventor: Larry T. Jost, St. Louis, Mo.

[73] Assignee: Southwestern Bell Technology Resources, Inc., Austin, Tex.

[21] Appl. No.: 235,714

[22] Filed: Apr. 29, 1994

Related U.S. Application Data

[63] Continuation-in-part of Ser. No. 53,655, Apr. 29, 1993, abandoned.

[51] Int. Cl.$^6$ .............................. G06F 12/06; G06F 12/10
[52] U.S. Cl. ............................ 395/404; 395/441; 395/412
[58] Field of Search ............................ 395/404, 440, 395/441, 412, 416

[56] References Cited

U.S. PATENT DOCUMENTS

| | | | |
|---|---|---|---|
| 4,145,745 | 3/1979 | De Bijl et al. | 395/404 |
| 4,399,503 | 8/1983 | Hawley | 395/440 |
| 4,433,374 | 2/1984 | Hanson et al. | 395/465 |
| 4,489,378 | 12/1984 | Dixon et al. | 395/853 |
| 4,530,055 | 7/1985 | Hamstra et al. | 395/463 |
| 4,811,203 | 3/1989 | Hanstra | 395/469 |
| 5,018,095 | 5/1991 | Nissimov | 395/404 |
| 5,193,184 | 3/1993 | Belsan et al. | 395/404 |
| 5,241,666 | 8/1993 | Idleman et al. | 395/872 |
| 5,315,602 | 5/1994 | Noya et al. | 371/40.4 |
| 5,379,391 | 1/1995 | Belsan et al. | 395/441 |
| 5,519,844 | 5/1996 | Stallmo | 395/404 |

FOREIGN PATENT DOCUMENTS

| | | |
|---|---|---|
| 0586117 | 3/1994 | European Pat. Off. . |
| 1231570 | 5/1971 | United Kingdom . |
| 1310467 | 3/1973 | United Kingdom . |
| 89/09468 | 10/1989 | WIPO . |

OTHER PUBLICATIONS

"Logical Addressing Extension for Multiple Disk Drive Units", IBM TDB vol. 32, No. 8A, Jan. 1990: 231–232 Jan. 1990.

Olson, Thomas M. "Disk Array Performance in a Random IO Environment" Computer Architecture News vol. 17, No. 5, Sep. 1989: 71–77 Sep. 1989.

APS 7800 Software Release Documentation Revision 7.7 (Apr. 14, 1994).

"A Discussion of Raid Technology" 1992 Dyna tek Automation System, Inc., 1991 Integra Technologies Inc.

Primary Examiner—Eddie P. Chan
Assistant Examiner—Reginald G. Bragdon
Attorney, Agent, or Firm—Greenblum & Bernstein P.L.C.

[57] ABSTRACT

In a data processing system, source block addresses are linearly mapped to virtual linear target disks equal in size to actual physical disks comprised by the long-term storage. Blocks of the virtual linear target disks are then assigned to disk-meshed disks equal in size to the actual physical disks whereby each block within a set of adjacently addressed linear target disk blocks is assigned to a separate disk-meshed disk. Controller meshing may be performed by assigning each disk-meshed disk to a controller-meshed disk which will comprise the actual physical disk, whereby respective sets of blocks within respective disk-meshed disks, all having the same disk controller, are assigned to equal-sized controller-meshed disks located on different disk controllers. Additional mechanisms that may be provided in the data processing system include efficient cache buffer lookup linked lists, and a mechanism for accelerating processing performed by an ancillary processing mechanism by ignoring a delay time.

7 Claims, 20 Drawing Sheets

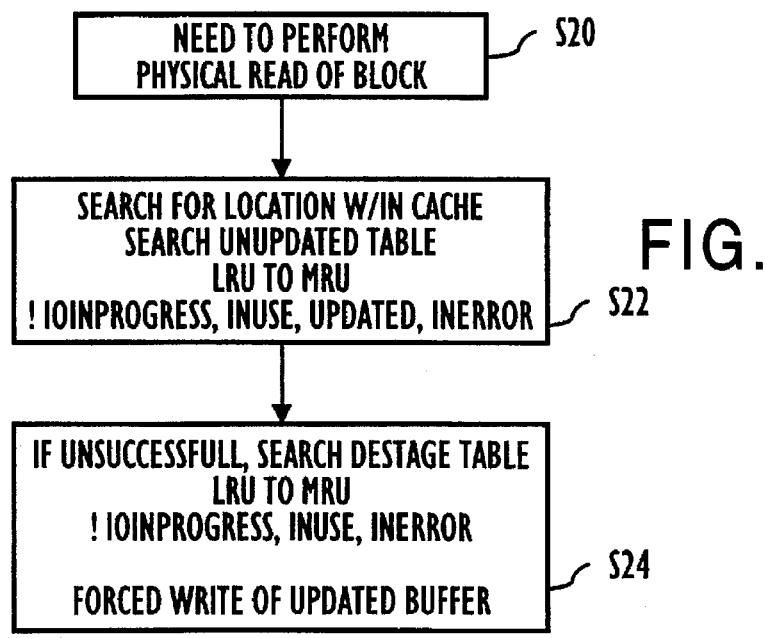
FIG. 6
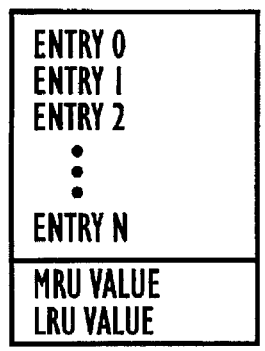
FIG. 7
FIG. 8

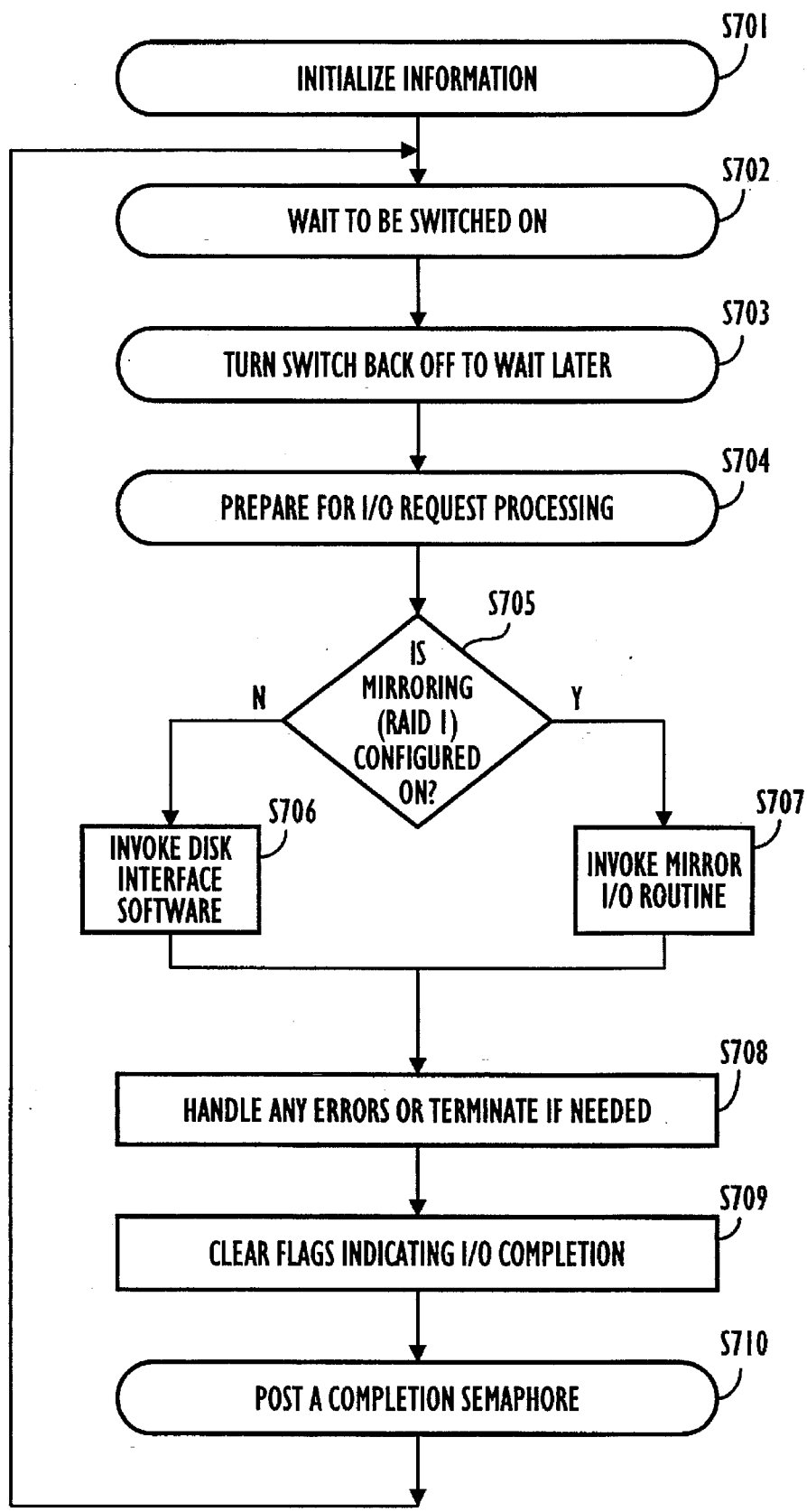

MEMORY SUBSYSTEM WITH DISK MESHING, CONTROLLER MESHING, AND EFFICIENT CACHE BUFFER LOOKUP

CONTINUING AND RELATED APPLICATION DATA

This is a continuation-in-part application of pending U.S. patent application Ser. No. 08/053,655, filed on Apr. 29, 1993, now abandoned in favor of U.S. patent application Ser. No. 08/724,149, entitled "Disk Meshing and Flexible Storage Mapping with Enhanced Flexible Caching," the content of which is expressly incorporated herein by reference in its entirety. In addition, this application is related to pending U.S. patent application Ser. No. 08/235,857, entitled "Dynamic Hypothesis Testing Cache Tuning System," filed on even date herewith and is further related to pending U.S. patent application Ser. No. 07/882,010, entitled "Open Architecture Interface Storage Controller," filed on May 13, 1992 abandoned in favor of U.S. patent application Ser. No. 08/373,896, now U.S. Pat. No. 5,530,845. The contents of each of these related applications are expressly incorporated by reference herein in their entireties.

COPYRIGHT NOTICE

A portion of the disclosure of this patent document contains or refers to materials which are subject to copyright protection. The copyright owner has no objection to the facsimile reproduction by anyone of the patent disclosure, as it appears in the Patent and Trademark Office's patent files or records, but otherwise reserves all copyright rights whatsoever.

BACKGROUND OF THE INVENTION

1. Field of the Invention

The present invention relates to a system for managing the transfer of data between two memories. More particularly, the present invention is directed to a data processing system with a hierarchical memory sub-system having at least a first level memory and a second level memory.

2. Discussion of Background Information

Computer systems are frequently provided with cache memory sub-systems of various types, in order to optimize the transfer of stored data within the system. One such type of cache memory sub-system utilizes disk caching. With disk caching, data intended for storage in disk storage (such as magnetic disk or rewritable optical disk) is first stored within an intermediate, quickly accessible memory (called a "cache").

Another storage mechanism for optimizing the transfer of stored data is called disk striping. In the process of disk striping, data intended for disk storage is divided into "stripes," and each stripe of data is written to a respective disk. Disk striping thus results in the concurrent transfer of several parts of a data block to several physical disks, and decreases the overall physical disk access time for the data block.

Some mainframe computers are provided with an interleaving mechanism for the mainframe computer memory. Interleaving is similar to disk striping, and may, at times, be rendered user configurable. With an interleaved mainframe memory, a block of data is divided into portions, and those portions are interleaved among separate locations within the mainframe computer's memory. This results in a decreased access time for retrieval and storage of data from and to the memory.

The general purpose of each of the above-described systems is to increase the efficiency of data exchanges between memories of a particular computer system. However, such memory I/O optimization mechanisms are frequently inflexible. That is, the parameters of such systems cannot be adjusted or changed by the user. In addition, such systems are frequently complex, and utilize excessive processing steps to achieve their objectives. In any event, there is still a need for alternate and/or supplemental I/O optimization mechanisms to further enhance the efficiency of memory I/O.

3. Definitions

For purposes of clarification, and to assist readers in an understanding of the present invention, the following terms used herein are defined as follows:

Data Block:

A single addressable unit of a disk (e.g., a track on a mainframe disk; or a sector on a SCSI disk).

Adjacent Data Blocks:

Data blocks that have addresses, specified in terms of a requester's addressing scheme, that indicate a proximate relationship between the data blocks. For example, when a string of data blocks within a storage device is being assigned, by a processor, the blocks within that string are typically assigned sequential (i.e., adjacent) addresses.

SUMMARY OF THE INVENTION

In view of the above, the present invention, through one or more of its various aspects and embodiments, and/or subcombinations thereof, is thus presented to bring about one or more objects and advantages disclosed herein, such as those noted below.

It is an object of the present invention to provide a system for maximizing the efficiency of data exchanges between memory devices, such as, for example, between physical disks and a cache, and between a high level memory (e.g., a host processor memory) and a cache. A more specific object of the present invention is to provide a system for transferring data between a processor and large capacity long-term storage.

In accordance with a particular aspect of the present invention, several related data blocks that are stored in long-term storage may be concurrently accessed. The retrieved data blocks may then be placed in a cache for fast access by a requesting processor.

It is a further object of the present invention to provide a disk cache having a writing mechanism for writing data from updated cache buffers to long-term storage, and a reading mechanism for reading data from long-term storage into un-updated cache buffers. The writing and reading mechanisms utilize efficient lookup methods for identifying updated cache buffers to write out and un-updated cache buffers to read into.

A further object is to provide a simplified, enhanced, and efficient memory hierarchy. Another object is to render such a memory hierarchy user-configurable, so that several parameters of the memory hierarchy are adjustable by the user.

The present invention, therefore, is directed to a data processing system which includes a processor, a hierarchical memory system comprising a cache and a long-term storage, a linear mapping mechanism, and a disk meshing mechanism.

The processor operates on various data and specifies a source block address that corresponds to a requested data block located within a memory to be accessed by the processor. The linear mapping mechanism linearly maps source block addresses, indicated according to a source addressing scheme of the processor, to virtual linear target disks equal in size to actual physical disks comprised by the long-term storage, so that each data block requested by the processor now has a virtual linear target address, including an assigned linear target disk and a linear target disk offset within the assigned linear target disk. The disk meshing mechanism assigns blocks of the virtual linear target disks to disk-meshed disks equal in size to the actual physical disks comprised by said long-term storage, whereby each block within a set of source blocks having adjacent source block addresses is assigned to a separate disk-meshed disk.

The data processing system may be further provided with a controller meshing mechanism which assigns each disk-meshed disk to a controller-meshed disk which will comprise the actual physical disk, whereby respective sets of blocks within respective disk-meshed disks (all having the same disk controller) will now be assigned to equal-sized controller-meshed disks located on different disk controllers.

In accordance with an additional aspect of the invention, the disk-meshing mechanism divides the virtual linear target disks into sets of N linear target disks, and meshes the source disk blocks of each linear target disk within a particular linear target disk set into N separate meshed disks. In accordance with a further aspect of the present invention, the disk meshing mechanism calculates a remainder of (the number of source disk blocks per physical target disk)/N, and generates a template, by dividing the total number of source disk blocks per target disk, substantially as evenly as possible, into a set of N meshed disk chunk sizes. The set of meshed disk chunk sizes comprises sizes of a meshed disk which will be needed to collectively hold all of the total number of source disk blocks per target disk. In addition, the disk meshing mechanism assigns, for each linear target disk, chunk sizes that will correspond to each meshed disk within the set of N meshed disks. The assigned chunk sizes will be the chunk sizes to which source disk blocks of the linear target disk may be meshed. By assigning the chunk sizes, all source disk blocks of all linear target disks will have a space, defined as part of a chunk size, within a meshed disk in the set of N meshed disks.

In accordance with a further aspect of the present invention, the data processing system may be provided with a further mechanism for utilizing assignment information gathered by the disk meshing mechanism to translate a source block address into a physical target disk address on an as-needed basis during I/O control of the hierarchical memory system.

The data processing system may be further provided with a mechanism for dividing the total number of target disks into two target disk subsets, so that the linear mapping mechanism may linearly map source disk block addresses to virtual linear target disks, equal in size to the actual physical disks comprised by the long-term storage and equal in number to ½ of the actual physical disks comprised by the long-term storage. In this regard, the data processing system may be further provided with a mechanism for performing RAID 1 disk mirroring.

In accordance with a further aspect of the invention, the data processing system may be further provided with a storage control processor which provides processor access to the requested data block within the cache, transfers data between the processor memory and the cache, and transfers data between the cache and long-term storage. In this regard, the storage control processor may comprise a mainframe storage controller.

BRIEF DESCRIPTION OF THE DRAWINGS AND APPENDICES

The present invention is further described in the detailed description which follows, by reference to the noted plurality of drawings by way of non-limiting examples of embodiments of the present invention, in which like reference numerals represent similar parts throughout the several views of the drawings, and wherein:

FIG. 6 illustrates a table of chunk sizes and offsets for the linear target disks and corresponding meshed disk numbers shown in FIG. 5;

FIG. 7 illustrates the relevant processing for performing a physical read of a block from the disks to the cache;

FIG. 8 illustrates unupdated table entries provided within an unupdated table;

FIG. 14 is a flow diagram that illustrates an object disk I/O thread process which may be provided in the illustrated RAID 1 implementation;

BRIEF DESCRIPTION OF THE APPENDICES

In order to further facilitate the detailed description of the present invention, reference is made to the noted plurality of appendices by way of non-limiting examples of preferred embodiments of the present invention, in which sample source code and comments are provided with respect to the various features, operations and functions of the invention, and wherein:

Appendices A–J are program listings in the C programming language which are provided to exemplify a particular implementation of various subsystems of the present invention.

Appendix A includes code for performing Disk Map Initialization;

Appendix B includes code for Calculating an Object Disk Address;

Appendix C includes code for performing a Do As Much I/O As I Can routine;

Appendix D includes code for Linking an Updated Object Disk List;

Appendix E includes code for Unlinking an Updated Object Disk List;

Appendix F includes code pertaining to Related Link Structures;

Appendix G includes code for Removing an Unupdated Cache Entry;

Appendix H includes code for Linking an Unupdated Item at MRU;

Appendix I includes code for Unlinking an Updated Item; and

Appendix J includes code for performing an Idle Detection routine.

DETAILED DESCRIPTION OF ILLUSTRATED EMBODIMENTS

A. The Data Processing System

Figure 1:
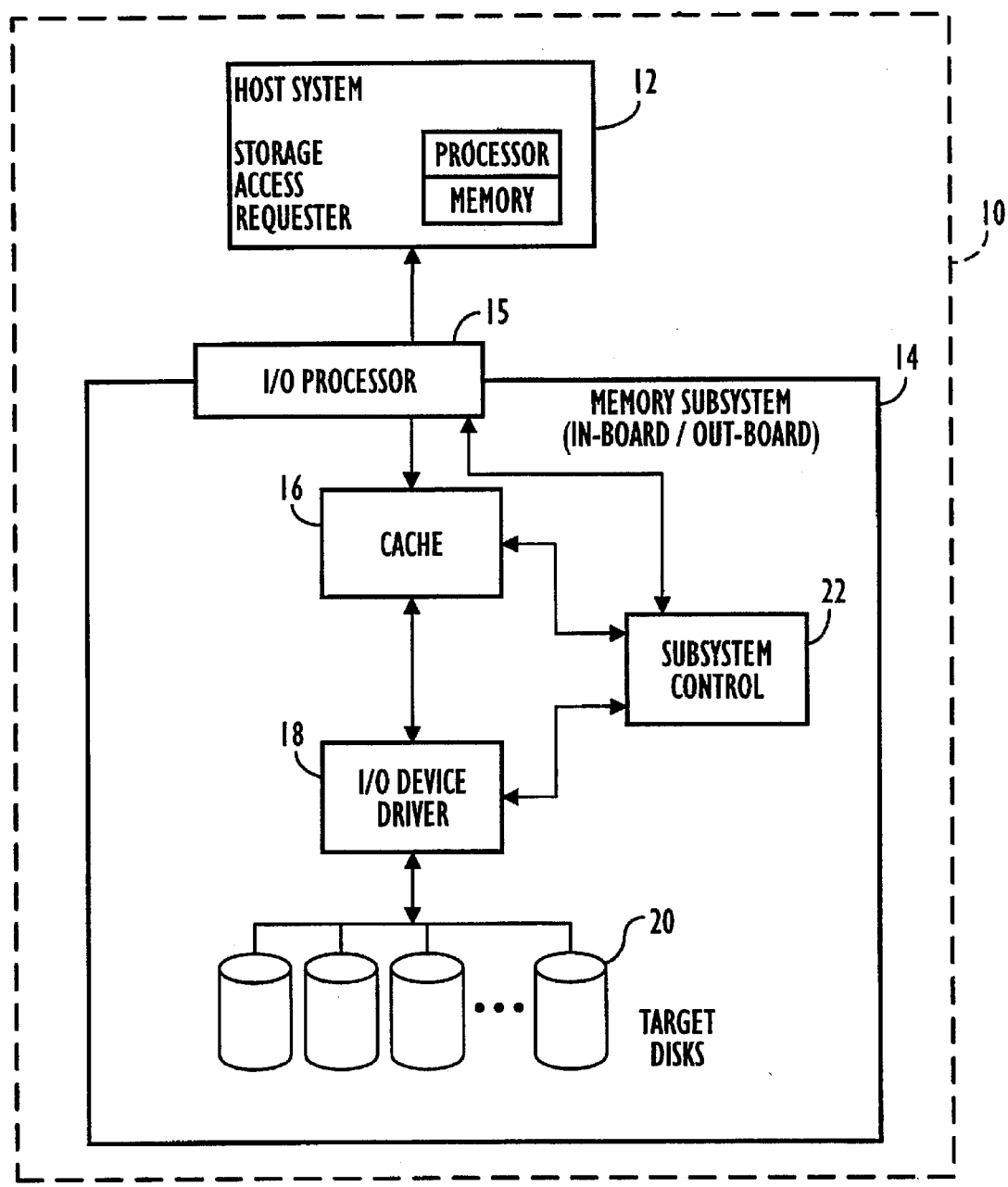
FIG. 1 is a system diagram of a data processing system.

Referring to the drawings now in greater detail, FIG. 1 illustrates a data processing system 10 having a host system (requester) 12 coupled to a memory subsystem 14. All or a portion of memory subsystem 14 may be provided either in-board or out-board of a host computer system such as host system 12. Memory subsystem 14 comprises an I/O processor 15, a cache 16, an I/O device driver 18, and a plurality of target disks 20. Memory subsystem 14 is also provided with a subsystem control mechanism 22 which is functionally connected to each of the I/O processor 15, cache 16, and I/O device driver 18.

The memory subsystem illustrated in FIG. 1 may comprise a system, e.g., as disclosed in Parent application Ser. No. 08/053,655. In addition, the illustrated memory subsystem may be used within an emulating storage control system, as disclosed in related U.S. application Ser. No. 07/882,010. More particularly, the illustrated memory subsystem may be implemented in the form of an APS 7800 level 341 PC-emulated storage controller as described, e.g., in APS 7800 Software Release Documentation Revision 7.7 (Apr. 14, 1994), ©Southwestern Bell Technology Resources, Inc., the content of which is expressly incorporated by reference herein in its entirety. It should be noted, however, that the memory subsystem and each of the subcomponents thereof may have independent significance in conjunction with other computer data processing systems and/or memory subsystems. Thus, the storage controller of application Ser. No. 07/882,010, the storage management system of the Jost application Ser. No. 08/053,655, and the APS storage controller as disclosed in the above-noted Release Documentation, are only examples of systems in which the present invention can be implemented.

B. The Cache Draining Mechanism

A physical data transfer mechanism called a cache draining mechanism may be provided in the illustrated memory subsystem. In accordance with the cache draining mechanism, cache 16 will drain data therefrom, i.e., send the data to target disks 20, under several conditions. For example, the data will be drained when it must be drained, in order for an access request to be satisfied by a memory subsystem 14. Such a "must" drain (a forced physical write) occurs when there is not sufficient space within cache 16 to place a requested data block for subsequent access by requester 12. There is not sufficient space within the cache when there is no available reusable block within the cache which could be reused without first being written out.

A cache drain may be performed under several conditions. Such conditions may include: when the cache is performing a physical read or a physical write operation (in which case the drain will be called a drain-on-read or a drain-on-write), when there is a forced physical write to a target disk (to provide available space in the cache so that a data block may be placed within the cache), and when the memory subsystem becomes idle while other certain conditions are met (such a drain is called cache trickle processing). Cache trickle processing, which also may be referred to as a dynamic sleeping trickle, may be configured to be performed when the following conditions are detected by the system: (1) the complete memory subsystem is idle, (2) no cache processing is taking place, (3) there is no pending cache activity, and (4) the Dynamic Sleep Time (DST) has elapsed since the last trickle attempt. In other words, when each of conditions 1–3 are presently true, and the DST has elapsed since the last trickle attempt, then the system will again actuate a trickle to the target disks.

Figure 2:
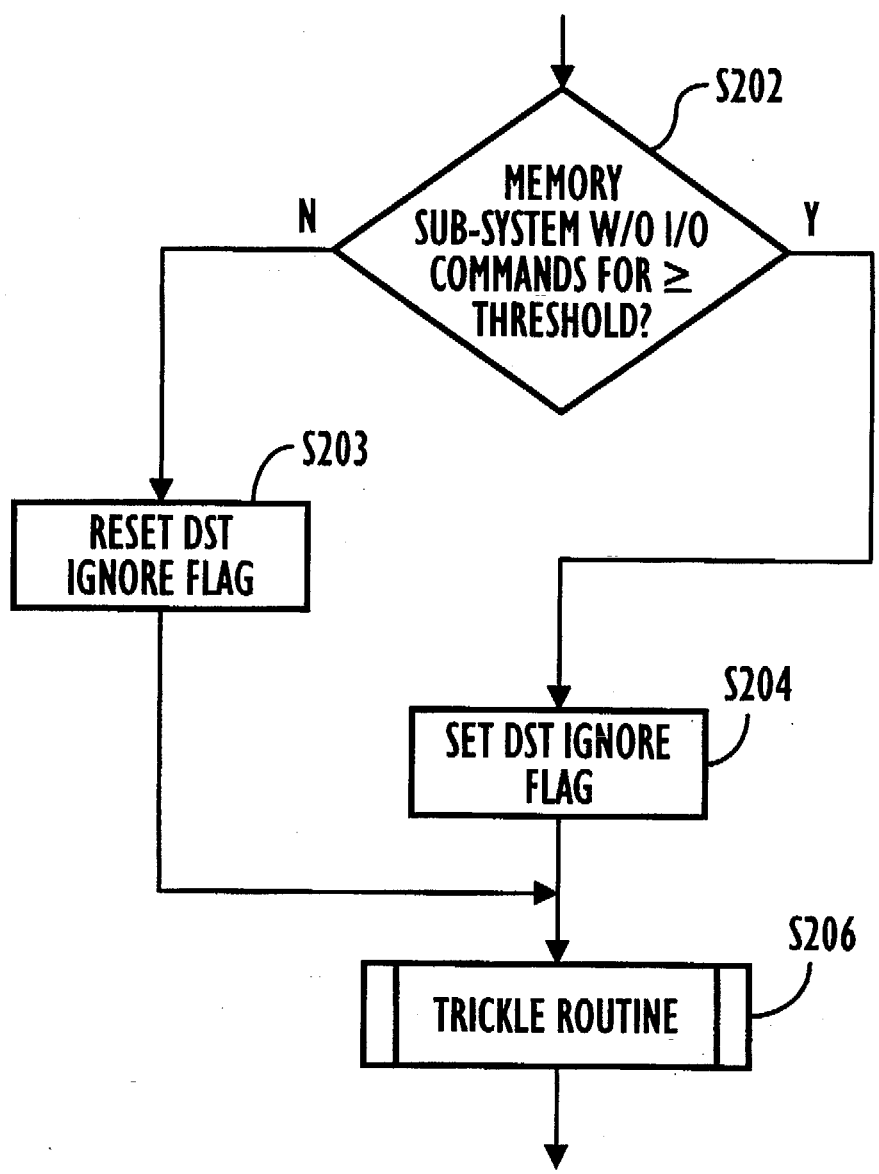
FIG. 2 is a flow diagram that illustrates the relevant portion of I/O processing which pertains to performance of an accelerated trickle processing mechanism.

The memory subsystem may be configured to have an accelerated trickle processing mechanism as illustrated in FIG. 2. When the memory subsystem has been idle for a pre-set minimum threshold amount of time (i.e., when no I/O commands are being processed by the memory subsystem), the trickle routine will be configured so that it will temporarily be adjusted to drain cache as quickly as possible, without regard to a dynamic sleep time value. As illustrated in FIG. 2, in a first step S202, a determination is made as to whether or not the memory subsystem has processed any I/O commands for a predetermined minimum threshold amount of time (e.g., 3 seconds). If it is determined that the memory subsystem is without I/O commands (requested by the requester/host) being processed for such a minimum threshold amount of time, the accelerated trickle processing will proceed directly to step S204, where a DST ignore flag will be set. When the DST ignore flag is set, the trickle routine, shown in step S206, will accordingly ignore the DST (dynamic sleep time) value and thus drain the cache as quickly as possible, without waiting for a dynamic sleep time to have elapsed since the last trickle attempt.

If it is determined in step S202 that the memory subsystem has been processing I/O commands from the requester, and thus has not been inactive, for the predetermined minimum threshold amount of time, then the process will proceed directly from step S202 to step S206, where the trickle routine will be executed, in accordance with its normal processing (considering whether or not the dynamic sleep time (DST) has elapsed since the last trickle attempt). It is noted that before returning from the trickle routine in step S206, the DST ignore flag will be reset in step S203, so that the trickle routine will not ignore the DST when it is called the next time unless the flag is again set in step S204.

C. Mapping and Meshing

Figure 3A:
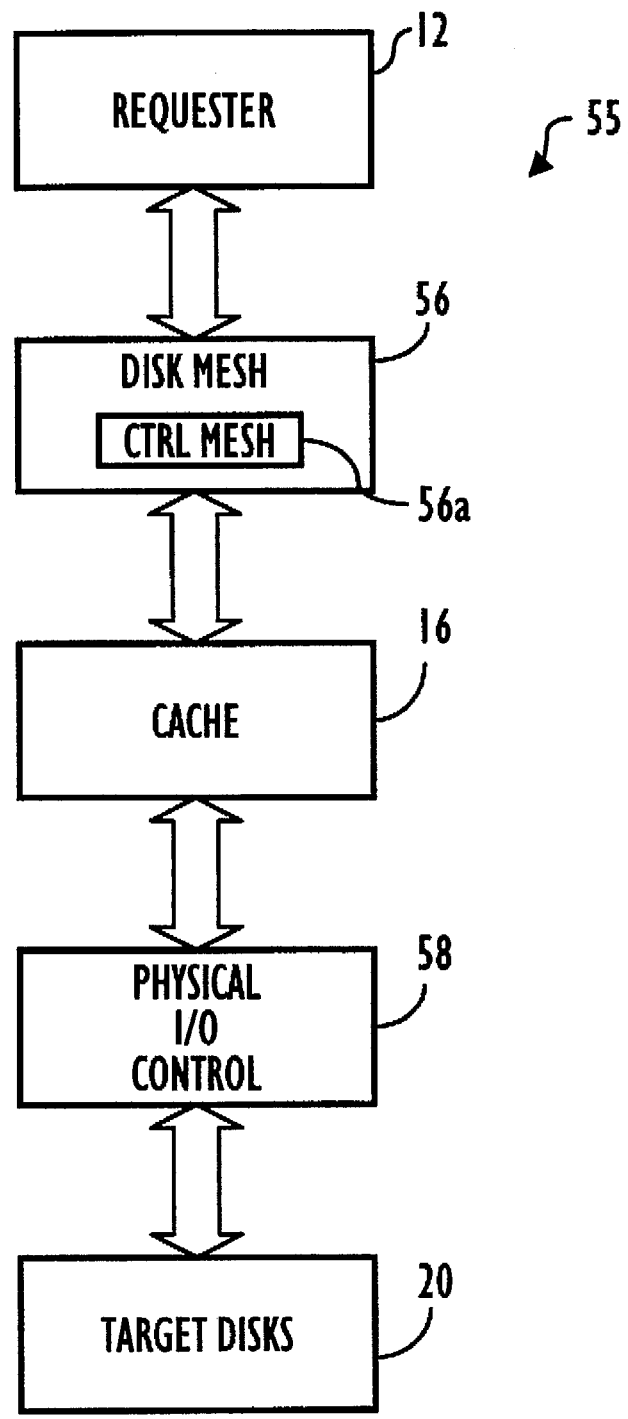
FIG. 3A is a flow diagram that illustrates the steps performed during execution of an access request I/O operation, in response to an access request made by a requesting host processor (requester)

FIG. 3A illustrates an overall physical I/O path of a data processing system of the illustrated exemplary embodiment of the present invention. As illustrated in FIG. 3A, data moves along a physical path that comprises a requester 12, connected to a disk mesh module 56, a cache 16, a physical I/O control 58 and target disks 20. Each time requester 12 requests access to a specified data block having a particular source address, the address of the specified data block is translated to a target disk address that correlates with the configuration of target disks 20. Sets of N individually addressable data blocks that have adjacent source addresses are allocated, in a rotating manner, among a selected group of N target disks 20. Such a rotating allocation of the requested block and neighboring addressable blocks constitutes a "meshing" (more specifically referred to herein as "disk meshing") of the I/O data among the N (disk-meshed) target disks. N represents the disk mesh factor of the meshing process.

Disk mesh module 56 may be further provided with a controller mesh module 56a, which allocates, in a rotating manner, a set of M (equal to the controller mesh factor) adjacent disk-meshed target disks among M different disk controllers. Such a rotating allocation of target disks among different controllers results in adjacent requested blocks being assigned to different disk controllers, and constitutes controller meshing of I/O data among M target disk controllers. M represents the controller mesh factor.

The translated (i.e., mapped and meshed) target disk addresses are utilized to reference data blocks within cache 16. If a data block is not available within cache 16, a physical I/O read operation is performed through the use of physical I/O control module 58. Subsequent to locating the data on target disks 20, and placing the same within cache 16, a cache index is then given to requester 12 for access.

Figure 3B:
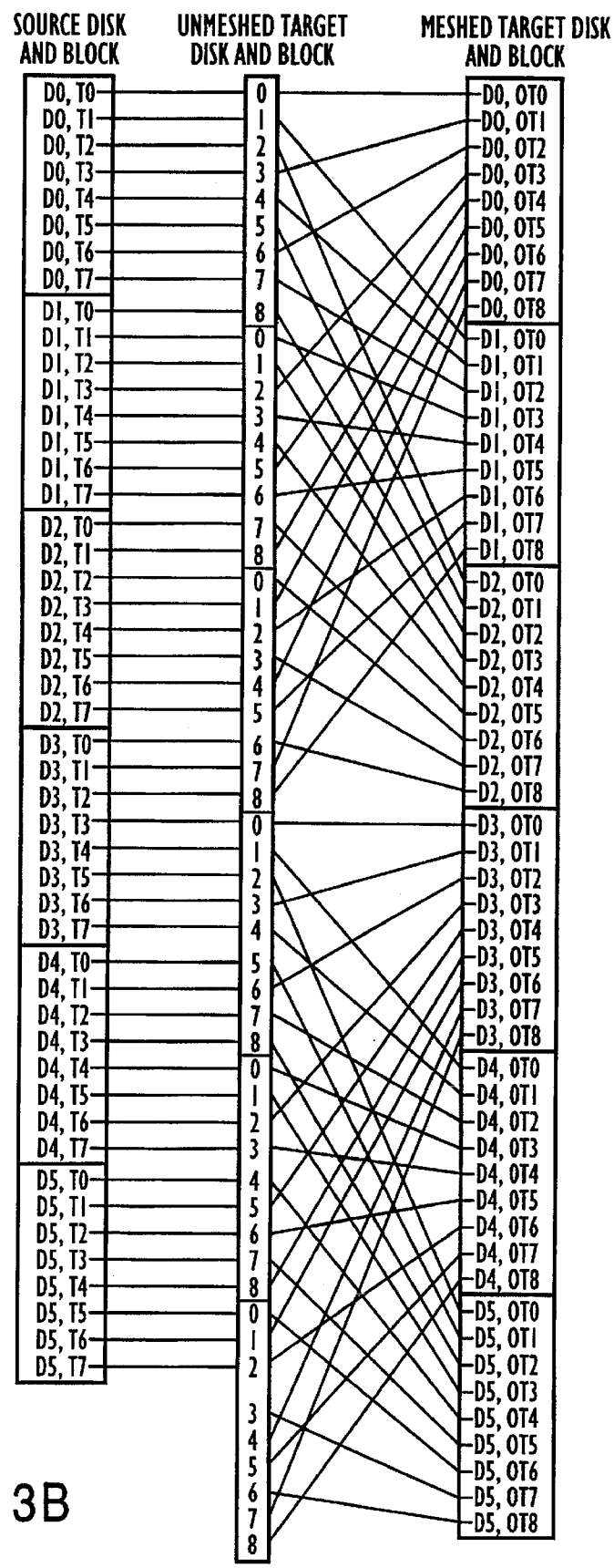
FIG. 3B illustrates the relative addressing and locations of data blocks as they are mapped and meshed from requester-specified source disks to physical target disks.

FIG. 3B shows an illustrative, but non-limiting, example of a disk mapping and meshing scheme executed by the subsystem control 22 (shown in FIG. 1), wherein several source disks and block locations are mapped to an unmeshed target disk and block, and are subsequently meshed (disk-meshed) to a target disk and block. In the illustrated example, the disk mesh factor is set to 3, and the blocks are tracks. There are eight (8) blocks per source disk, nine (9) blocks per target disk, six (6) source disks and six (6) target disks. The illustration is greatly simplified for purposes of explanation. For example, the storage media illustrated are very small as compared to actual storage devices that are available on the market. However, the principles discussed herein are to be utilized in such actual storage devices.

The first, left-hand column of the illustrated diagram, labeled "Source Disk and Block," shows six (6) source disks (D0–D5), each with eight (8) blocks (tracks) identified as T0–T7. In a first phase of a disk mapping, the source disk number and block number are linearly mapped to a target disk addressing scheme. The second column heading, "Unmeshed Target Disk and Block," represents this intermediate step. Once an unmeshed target disk number and offset are determined for a given source disk number and offset, the unmeshed information is then disk meshed to a new mapping that corresponds to the physical target disks, which are shown below the column heading "Meshed Target Disk and Block."

It is noted that the blocks in this illustration of each of the source disks and the target disks are equal in size. In implementation, the target disk blocks will likely comprise several smaller addressable target disk sectors which are sequentially accessed in order to store data from a single source disk block. For example, the target disk blocks may comprise 94 physical sectors, which correspond to the data of a single source disk track. For purposes of I/O, the block being transferred between the cache and the target disks corresponds to the size of the source disk block, and thus would include the necessary number of target disk sectors which can contain each source disk block.

Figure 3C:
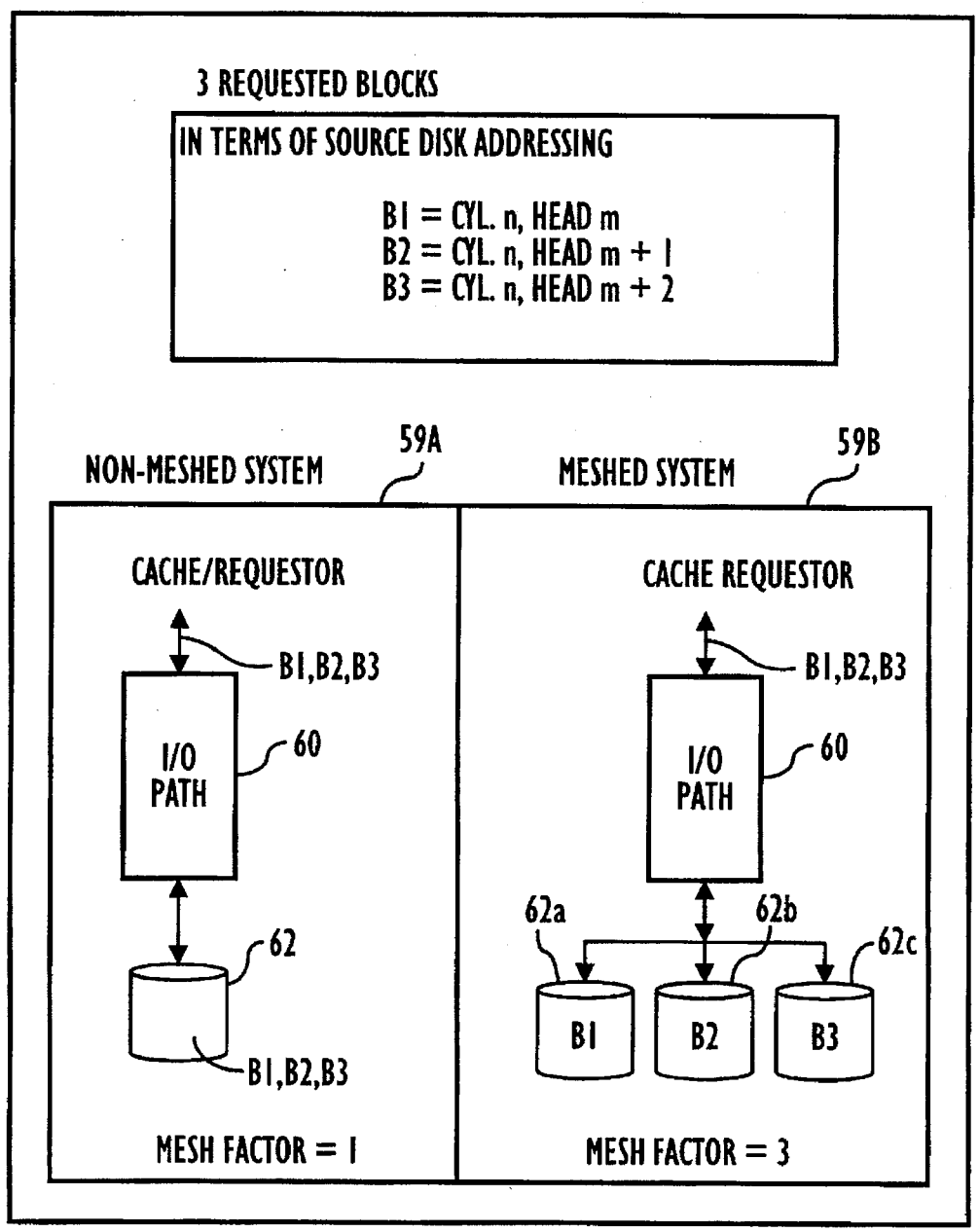
FIG. 3C is a comparison diagram which is presented to illustrate the relative operation of a meshed disk storage system as compared to a non-meshed disk storage system when performing I/O of three requested sequentially addressed blocks of data, B1, B2, and B3.

FIG. 3C comprises a comparison diagram, in which a non-meshed storage system 59A and a meshed storage system 59B are each illustrated, and demonstrates the concurrent block I/O capability of a meshed storage system 59B. In the event that a physical I/O must be performed for three (3) requested blocks of data having adjacent source disk addresses, a non-meshed system (having an effective mesh factor of 1) will need to perform all I/O sequentially with the same disk. In comparison, in a meshed system, each of the adjacently addressed blocks B1, B2 and B3 will be present upon separate disks, and thus can be concurrently accessed in performance of the physical I/O.

In FIG. 3C, each of the requested blocks have, for example, addresses as follows: B1=cyl n, head m, B2=cyl n, head m+1, and B3=cyl n, head m+2. Each of the non-meshed system 59A and meshed system 59B requests all of the three requested blocks, B1, B2 and B3, and includes an I/O path 60. However, the non-meshed system 59A only includes one non-meshed disk 62, which holds the requested blocks, while meshed system 59B includes three respective meshed disks 62a, 62b, and 62c, which include the rotatably allocated adjacently addressed blocks B1, B2 and B3. In the meshed system 59B, the mesh factor is equal to 3.

Figure 3D:
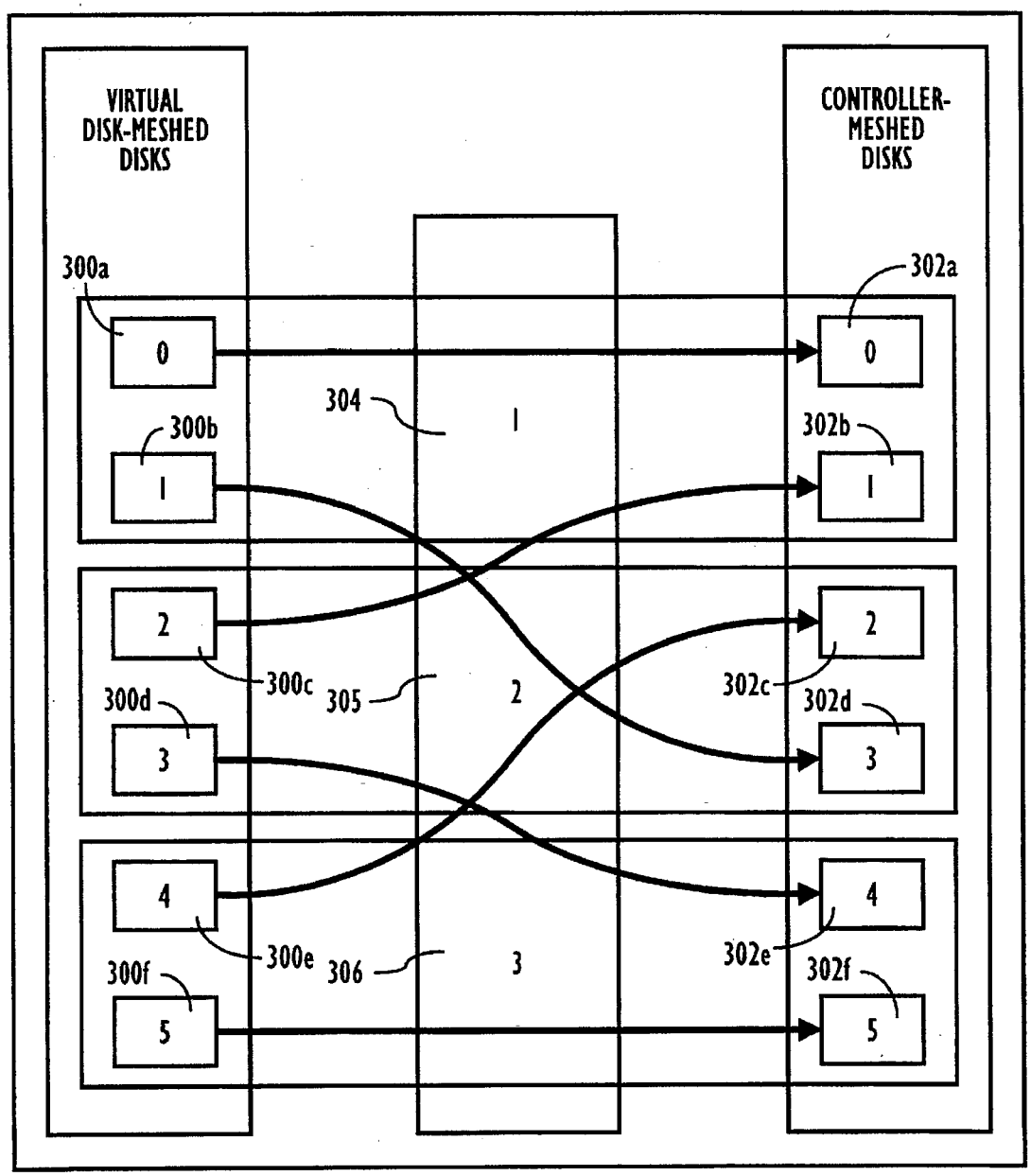
FIG. 3D illustrates an example assignment of disk-meshed disks to controller-meshed disks.

FIG. 3D comprises a diagram which includes a plurality of (virtual) disk-meshed disks 300a–300f which are controller-meshed onto controller-meshed (physical) disks 302a–302f. Each of the disks 302 corresponds to a particular one of disk controllers 304, 305, and 306. More specifically, each of controller-meshed disks 302a and 302b are controlled by disk controller 304. Controller-meshed disks 302c and 302d are each controlled by disk controller 305. Controller-meshed disks 302e and 302f, are each controlled by disk controller 306.

The disk-meshed disks are controller-meshed as illustrated, with a controller mesh factor M of 2. Thus, each of disk-meshed disks 300a and 300b are controller-meshed so that disk-meshed disk 300a is assigned to controller-meshed disk 302a (on a first controller 304), and disk-meshed disk 300b is assigned to controller-meshed disk 302d (on a second/different disk controller 305). Similarly disk-meshed disks 300c and 300d are controller-meshed to separate disks controllers (304 and 306) by respectively assigning them to controller-meshed disks 302b and 302e. Disk-meshed disks 300e and 300f are controller-meshed to separate disk controllers (305 and 306) by respectively assignment them to controller-meshed disks 302c and 302f.

Figure 4:
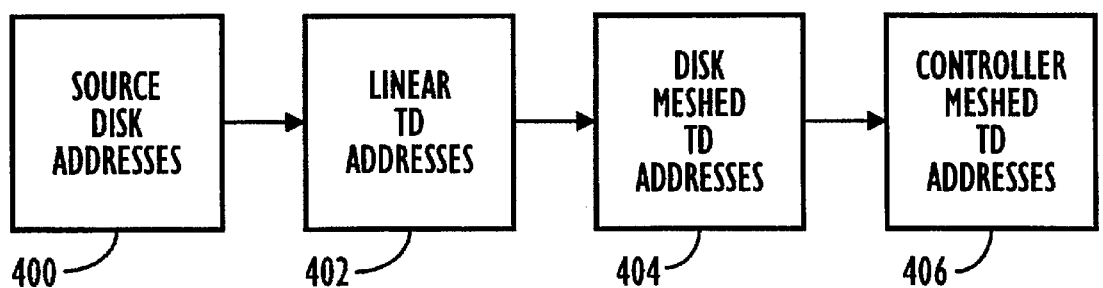
FIG. 4 is a functional block diagram illustrating the conversions performed in translating source disk addresses to controller-meshed target disk addresses.

FIG. 4 generally illustrates the conversions that are performed in the process of translating source disk addresses 400 to controller-meshed target disk addresses 406. Source disk addresses 400 are converted to linear target disk addresses 402, which are then converted to disk-meshed target disk addresses 404, and subsequently converted to controller-meshed target disk addresses 406.

The presently-disclosed storage mapping and meshing system comprises improvements over a similar system as disclosed in parent application U.S. Ser. No. 08/053,655. As disclosed in the parent application, in order to perform the mapping and meshing, the disk mesh factor needed to be evenly divisible into the number of source disk blocks that will fit on a target disk. However, with the present mapping and meshing system as disclosed herein, it is not required that the mesh factor be evenly divisible into the number of source disk blocks per target disk. The only requirements are that the number of target disks that will be used be a multiple of the mesh factor, and further that the number of target disks being used are a multiple of the controller mesh factor. Thus, in the system presently disclosed, any number of any size source disks can be mapped onto any number of any size target (object) disks, provided that some basic rules are applied as described in parent application U.S. Ser. No. 08/053,655.

In addition to the above benefits, and by the further provision of controller-meshing, sequentially addressed source disk blocks will generally be placed on different sequentially (circularly) numbered target disks by disk meshing, and those disks will be connected to different sequentially (circularly) numbered disk controllers. Thus, sequential drains/writes (made by the cache in terms of object disk number reference, as provided in a drain mechanism (e.g., as disclosed in detail herein)), and pre-reads which will be of sequentially addressed (requester-specified) source disk blocks take place from different target disks through different target disk controllers. Therefore, throughput is improved by reducing disk and disk controller bottlenecks for target disk accesses.

An example set of algorithms are described below to illustrate the specific calculations which may be performed by the mapping and meshing system described herein. All of the reference values are integers, unless otherwise noted, and the math is integer math or module function math as indicated.

MAPPING AND MESHING INITIALIZATION STEPS (1) Initialize a table to take into account meshing of target disk controllers.

(1.1) If the target disk controller meshing value is configured to 0, no meshing is desired. In this case, set the controller meshed target disk table's i'th entries to i, where i ranges from 0 to the integer value one less than the number of object disks configured. (1.2) If the target disk controller meshing value is not configured to 0, perform the following process in order to provide the target disk re-mapping to accomplish the controller meshing:

For each target disk configured, numbered 0 through one less than the count of target disks configured, such number represented by i:
Set the controller meshed disk number for disk i to:

$$CMDN_i = (i \% CM) * ((NTD-1)/CM) + (i \% CM)$$

where:
$CMDN_i$ is the ith Controller Meshed Disk Number.
CM is the configured Controller Mesh value.
NTD is the configured Number of Target Disks.
% represents integer modulo function.
+, −, *, / represent add, subtract, multiply, divide, respectively.

This provides a round-robin type of rotation of assignments of target-disks-before-controller-meshing to target disks-after-controller-meshing, rotating around the set of controllers configured, stored in MDN.

(2) Initialize the unmeshed starting target disk number for the first source disk to 0. Note that the first target disk is disk 0 regardless of the controller meshing value used.

$$USTDN_0 = 0.$$

where:
USTDN is the Unmeshed Starting Target Disk Number.

(3) Initialize the unmeshed starting target disk block offset for the first source disk to 0. Note that the first target disk is disk 0 regardless of the controller meshing value used.

$$USTDBO_0 = 0.$$

where:
USTDB0 is the Unmeshed Starting Target Disk Block Offset.

(4) For each additional source disk configured, disk i, perform the following steps:

(4.1) Set a scratch value, BO, to the target disk i's block offset starting position assuming it would reside on the same target disk as the prior source disk:

$$BO = (USTDBO_{i-1}/TDBPSDB) + SDBPSD$$

where:
$USTDBO_{i-1}$ is the USTDBO from the prior source disk.
TDBPSDB is the number of Target Disk Blocks Per Source Disk Block as configured.
SDBPSD is the number of Source Disk Blocks Per Source Disk as determined based upon configured values.

(4.2) Set the $USTDN_i$ to the USTDN for the prior source disk ($USTDN_{i-1}$) in anticipation of the source disk i's starting block residing on the same target disk as the prior source disk began on.

$$USTDN_i = USTDN_{i-1}$$

where:
USTDN is as previous defined.

(4.3) If the scratch Block Offset value, BO, just calculated is greater than or equal to the number of Source Disk Blocks Per Target Disk (SDBPTD), as calculated based on configured values, correctly store the USTDN and USTDBO for the ith source disk:

$$USTDN_i = USTDN_{i-1} + (BO/SDBPTD)$$

$$USTDBO_i = (BO \% SDBPTD) * TDBPSDB$$

where:
All terms are as previously defined.

(4.4) If the scratch Block Offset value, BO, just calculated was not greater-than-or-equal-to the number of Source Disk Blocks Per Target Disk (SDBPTD), as calculated based on configured values, the USTDN stored is correct as stored in step 4.2 above, so simply store the correct USTDBO for the ith source disk:

$$USTDBO_i = BO * TDBPSDB$$

where:
All terms are as previous defined.

The above steps identify the starting locations of each source disk on a target disk via a target disk number and a target disk offset. However, it assumes a linear mapping through the entire set of all target disks for all source disks. It is then necessary to determine information for defining the source disk locations based upon meshed target disks.

(5) Determine the "base" size of each meshed chunk of data MB. That is, determine the target disk space required for holding all of the data from a given source disk that will reside on the given target disk, provided that the data for any given source disk will be divided up onto one continuous chunk on each of the target disks in a meshed target disk set. The "base" size considers the result of an integer division and does not consider handling of the remainder of that division.

$$MB=(SDBPTD/DMF)*TDBPSDB$$

where:

MB is the Mesh Base value.
DMF is the Disk Mesh Factor configured.
All other terms are as previously defined.

(6) Determine the remainder from the division used to calculate the MB value. This determines how many source disk blocks need to be allocated in addition to the MB value for each source disk being mapped and meshed:

$$MR=SDBPTD \, \%DMF$$

where:

All terms are as previously defined.

(7) Next determine a "Meshing Template", MT, for each Meshing Increment,i, from 0 through the value of DMF-1. The size of each source disk allocation onto target disks will be determined by the meshed interval number, 0 through DMF, being mapped to each target disk in the meshed disk sets. This value needs to spread the remainder of space allocations from MR over the target disks, each of MR target disks receiving one additional source disk block of data beyond the Mesh Base, MB, amount of storage.

$$MT_i=MB$$

Then, if i is less than MR:

$$MT_i=MT_i+TDBPSDB$$

where:

MT is the Meshing Template
All other terms are as previously defined.

(8) Next, for each target disk numbered 0 through DMF-1 in a meshed disk set, establish the size and offset for each unmeshed target disk's allocation on each meshed target disk as specified. Do this first for unmeshed disk 0 onto each of the target disks in a meshed set, number 0 through DMF-1. This is meshing based on target disks to target disks. The source disk no longer has a bearing in these calculations. As i varies from 0 through the DMF-1:

$$LTD_0.MDN_j.S=MT_j$$

$$LTD_0.MDN_j.O=0$$

where:

$LTD_n.MDN_m.S$ is the Size value in units of Target Disk Blocks for the Linear (not yet meshed) Target Disk number of subscript n with a Meshed Disk Number m
All other terms are as previously defined.

Then perform the same for the rest of the target disks in a meshed set:

As i varies from 1 to DMF-1:

$$k=0$$

As j varies from i to i+DMF-1

$$LTD_i.MDN_j \, \%_{DMF}.S=MT_k$$

$$k=k+1$$

As i varies from 1 to DMF-1
 As j varies from 0 to DMF-1
$$LTD_i.MDN_j.O=LTD_{i-1}.MDN_j.O+LTD_{i-1}.MDN_j.S$$
where:
k is a scratch value
All other terms are as previously defined.

REAL-TIME DISK-MESHED AND CONTROLLER-MESHED TARGET DISK TRANSLATION

The values determined in the above-described mapping and meshing initialization steps are then used as a basis for determining the meshed target disk location for each source disk address as required. This processing is described in the following steps.

(1) The Source Disk Number (SDN) and Source Disk Offset (SDO) are provided as inputs to the calculations. The SDO can be in parts, such as Cylinder and Head, but will be calculated to a single offset value before calculations commence, forming it into source disk block number (e.g., (Cylinder * Heads Per Cylinder)+Head=source disk block number). The SDO is a number from 0 to the number of source disks configured minus 1.

(2) Calculate a Temporary Offset (TO) based upon the unmeshed offset on the target disks at which the designated SDN begins:

$$TO=(USTDBO_{SDN}/TDBPSDB)+SDO$$

where:

All terms are as previously defined.

(3) From that temporary unmeshed offset value, determine the correct unmeshed target disk offset value by reducing it by multiples of disk sized units and saving the remainder:

$$UMTDO=(TO \, \%SDBPTD)*TDBPSDB$$

where:

UMTDO is the UnMeshed Target Disk Offset.
All other terms are as previously defined.

(4) Based upon the TO and target disk sizes, determine the correct unmeshed target disk number for the SDN and SDO specified:

$$UMTDN=USTDN_{SDN}+(TO/SDBPTD)$$

where:

UMTDN is the UnMeshed Target Disk Number.
All other terms are as previously defined.

(5) The UMTDO and UMTDN must now be modified to accomplish disk meshing based on the DMF specified. The Meshed Target Disk Number (MTDN) is calculated first. This is done as follows:

$$MTDN=((( UMTDO/TDBPSDB)+UMTDN \, \%DMF)+((UMTDN/DMF)*DMF)$$

where:

All terms are as previously defined.

(6) Finally, the Meshed Target Disk Offset (MTDO) is determined based upon meshed disk set position and previously calculated values:

$$MTDO = LTD_{UMTDN\ \%DMF} \cdot MDN_{MTDN\ \%DMF} \cdot O + (((UMTDO/TDBPSDB)/DMF) + TDBPSDB)$$

where:

All terms are as previously defined.

(7) The final step is to perform Controller Meshing. As this does not affect offsets, but rather simply re-maps entire target disks to new locations, only the target disk numbers are modified. This is accomplished by looking up the MTDN in the previously initialized $MDN_n$ values:

$$FTDN = CMDN_{MTDN}$$

where:

FTDN is the Final Target Disk Number.

All other terms are as previously defined.

Upon execution of the meshing and mapping steps described above, the values Final Target Disk Number (FTDN), Meshed Target Disk Offset (MTDO) have been determined in order to associate a Source Disk Number (SDN) and Source Disk Offset (SDO) with actual target disk data.

It is noted that the above-described calculations for mapping and meshing are performed for a subset N (the disk-mesh factor) of linear target disks being mapped, and meshed, in order to prevent the use of excessively large numbers in calculating mapping and meshing values. For example, if all of the potential source disks were translated in one complete group to corresponding linear target disks and eventually to controller-meshed disks, the values of offsets would become quite large and might require storage allocations that exceed those naturally provided by the particular code being used. The particular process disclosed provides elegance and simplicity in its final calculations, along with robustness of the allowed characteristics of the source and target devices.

Appendix A includes a source code listing which corresponds to the Mapping and Meshing initialization steps described above, and Appendix B includes a source code listing which corresponds to the Real-time Disk-Meshed and Controller-Meshed Target Disk Translation steps described above. The following tables, 1.1 and 1.2, are provided to indicate the respective lines of code that generally correspond to the above-described process steps (for Appendices A and B).

TABLE 1.1

| Mapping and Meshing Initialization (Steps) | Appendix A Source Code Lines |
|---|---|
| 1 | 10–20 |
| 1.1 | 10–12 |
| 1.2 | 13–14 |
| 2 | 32 |
| 3 | 33 |
| 4 | 43–67 |
| 4.1 | 48–49 |
| 4.2 | 50 |
| 4.3 | 51–58 |
| 4.4 | 59–63 |

TABLE 1.1-continued

| Mapping and Meshing Initialization (Steps) | Appendix A Source Code Lines |
|---|---|
| 5 | 74–76 |
| 6 | 77–78 |
| 7 | 86–93 |
| 8 | 96–107 |

TABLE 1.2

| REAL-TIME Translation (Steps) | Appendix B Source Lines |
|---|---|
| 1 | 16–17 |
| 2 | 14–17 |
| 3 | 18–19 |
| 4 | 20–21 |
| 5 | 25–28 |
| 6 | 29–36 |
| 7 | 38 |

As disclosed above, a linear mapping mechanism is provided which linearly maps source block addresses, indicated according to a source addressing scheme of a requester (e.g., a mainframe computer), to virtual linear target disks (LTD's) that are equal in size to actual physical object (target) disks (OD's) that form target disks 20 as illustrated FIG. 1. The linear mapping may be performed so that each data block (source data block) requested by the requester now has a virtual linear target disk address and a linear target disk offset. These steps are generally performed in steps 1–4 of the mapping and meshing initialization steps described above.

Figure 5:
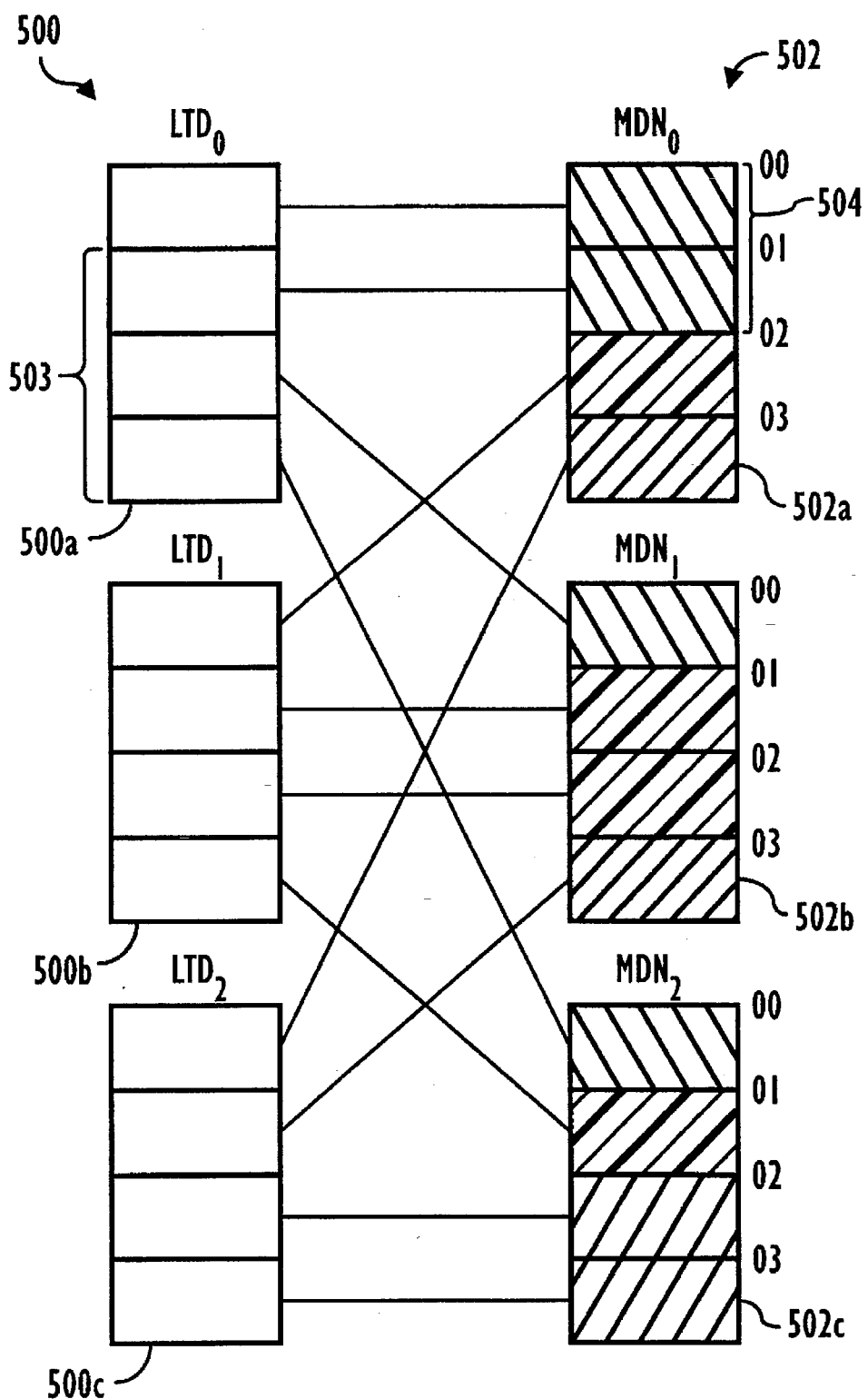
FIG. 5 is a diagram which illustrates the relationships between subscripted linear target disks $LTD_0$, $LTD_1$, and $LTD_2$ to meshed disk numbers $MDN_0$, $MDN_1$, and $MDN_2$.

FIG. 5 illustrates, in a simplified exemplary diagram, a sub-group of linear target disks 500 which are disk-meshed onto a sub-group of disk-meshed disks 502. In the illustrated example, once linear mapping of source block addresses is performed, resulting in each source block having an address in terms of a linear target disk, disk meshing is performed which includes assigning the source blocks of virtual linear target disks 500a–500c to disk-meshed disks 502a–502c equal in size to the actual physical target disk comprised by the long-term storage (e.g., target disks 20 as illustrated in FIG. 1). The source disk blocks from the linear target disks 500a–500c are assigned to disk-meshed disks 502a–502c so that each source disk block, within a set 503 of adjacent linear-target-disk-addressed source blocks, is assigned to a separate disk-meshed disk 502a, 502b, and 502c.

More particularly, disk meshing is performed by dividing the virtual linear target disks 500a–500c into sets of N (N=3 in the example illustrated) linear target disks, and meshing source disk blocks of each linear target disk 500a–500c within a particular linear target disk set 500 (which comprises linear target disks 500a, 500b, and 500c) into N (3) separate meshed disks 502a–502c.

In order to mesh the source disk blocks of each linear target disk into the N separate meshed disks, e.g., in order to mesh the source disks of each linear target disk 500a, 500b, 500c to the three separate meshed disks 502a, 502b, 502c in FIG. 5, a template is generated by dividing the total number of source disk blocks per target disk, substantially as evenly as possible, into a set of N(3) meshed disk chunk sizes which comprise sizes of a meshed disk which will be needed to collectively hold all of the total number of source disk blocks per target disk.

Referring to the example given in FIG. 5, a template is accordingly generated by dividing the total number of source disk blocks per target disk (which equals 4), substantially as evenly as possible, into N (i.e., 3) pieces, where each piece comprises a meshed disk chunk size, which comprises the size of a meshed disk which will be needed to collectively hold all of the total number of source disk blocks per target disk. Finally, the set of three meshed disk chunk sizes generated (e.g., in FIG. 5, the set would include (2, 1, 1). This comprises the generated template. The generation of the template is described in further detail in steps 5–8 of the Mapping and Meshing Initialization Steps described above.

Once the template of disk chunk sizes is generated, for each linear target disk to be meshed, the chunk sizes are assigned to correspond to each meshed disk within the set of N (N=3 in the example of FIG. 5) meshed disks to which source disk blocks of each may be meshed. For example, for linear target disk 500a in FIG. 5, a chunk size of 2 is assigned for meshed disk 502a, a chunk size of 1 is assigned for meshed disk 502b, and a chunk size of 1 is assigned for meshed disk 502c. The chunk sizes assigned for each of linear disks 500a, 500b, and 500c are illustrated by the different kinds of hatched lines within each of meshed disks 502a, 502b, and 502c.

The source disk blocks of each target linear disk are accordingly assigned a space, as part of a chunk size, within a meshed disk in the set of N meshed disks. Accordingly, referring to the example in FIG. 5, a first source disk block ($LTD_0$) 500a has a space, defined as part of a chunk size 504 within meshed disk ($MDN_0$) 502a in the 3 meshed disk set 502. The assignment of chunk sizes for each linear target disk (along with an assigned offset for each un-meshed target disk's allocated chunk) is described in further detail above in step 8 of the Initialization Steps. Referring to the example given in FIG. 5, linear target disk ($LTD_0$) 500a is assigned a chunk 504 having a size of 2 and an offset 0 (represented in FIG. 5 by O0) which corresponds to meshed disk ($MDN_0$) 502a.

FIG. 6 includes a Table of the chunk sizes and offsets corresponding to the respective linear target disks and meshed disks of the example given in FIG. 5. As can be seen in the Table, linear target disk $LTD_0$ is assigned: a chunk size having a size 2 (two source disk blocks) and an offset of 0 within the first meshed disk $MDN_0$, a chunk size of 1 and an offset of 0 for the second meshed disk $MDN_1$, and a chunk size of 1 and an offset of 1 for the third meshed disk $MDN_2$. Linear target disk $LTD_1$ is assigned: a chunk size of 1 with an offset of 2 on the first meshed disk $MDN_0$, a chunk size of 2 with an offset of 1 on the second meshed disk $MDN_1$, and a chunk size of 1 with an offset of 1 for the third meshed disk $MDN_2$. Similarly, the third linear target disk $LTD_2$ is assigned: a chunk size of 1 with an offset of 3 on the first meshed disk $MDN_0$, a chunk size of 1 with an offset of 3 for the second meshed disk $MDN_1$, and a chunk size of 2 with an offset of 2 for the third meshed disk $MDN_2$.

The values thus obtained by performing the above-described steps related to mapping and meshing may then be used in order to determine the meshed target disk location for each source disk address as required (in real time) whenever an access is requested by the requester. The process for making such a determination is described in detail above in the Real Time Translation steps.

The APS 7800 Software Release Documentation Revision 7.1 (noted above) discloses several additional features that may be provided in a mapping and meshing system as disclosed herein.

D. Cache Buffer Lookup

In parent application U.S. Ser. No. 08/053,655, in order to locate a cache block to write the data therefrom out to the physical disks, or in order to locate a non-updated cache block within the cache to which data may be read into from the physical disks, a complete destage table is searched from LRU to MRU of the destage table entries (DTE's) which correspond to all of the blocks for all of the target disks. An efficient cache buffer lookup mechanism may be provided as disclosed herein, whereby a separate smaller linked list (arranged in order from LRU to MRU) of pointers to cache blocks may be searched so that cache blocks that are the best candidates for use may be more quickly located. In this regard, in order to perform a drain operation, an updated list may be provided that corresponds to each target disk that may be written out to. In order to perform reads to cache buffers located within the cache, and an unupdated list may be provided which includes pointers to all of the unupdated cache buffers. Each of these lists is significantly smaller than the complete destage table entry list, and contains only viable candidate entries for the operation to be performed and thus would accordingly save a significant amount of search processing time when performing either a drain or a read operation.

1. Performing Read Operation

If an I/O is instructed to perform a read, then the process illustrated in the flow chart of FIG. 7 may be performed, utilizing an unupdated table (sub-list) as illustrated in FIG. 8.

As disclosed in parent application 08/053,655, in order to perform a read, a search was made, from LRU to MRU, of a destage table, in order to select a cache buffer within which the read data block could be placed. An unupdated cache buffer, that is not either active in an I/O, in use, updated, or in error was searched for. If the search of the destage table was unsuccessful, the destage table would again be searched, but this time considering updated cache buffers, in addition to unupdated cache buffers, that were not either active in an I/O, in use, or in error. If an updated cache buffer was then found, a forced write would be performed from the updated buffer.

In accordance with the illustrated efficient cache buffer lookup mechanism of the present invention, the process of reading a block may be performed as shown in the flow chart of FIG. 7, utilizing a sub-list as illustrated in FIG. 8, rather than the complete destage table. As shown in FIG. 8, the sub-list includes an unupdated table having a number of unupdated table entries which correspond to the cache buffers which are unupdated. In this regard, destage table entries (DTE's) may be utilized in order to indicate each unupdated cache buffer, placed in order, with most-recently-used (MRU) cache buffer at the top of the list and the least-recently-used (LRU) cache buffer placed at the bottom of the list.

Referring again to FIG. 7, the process illustrated therein will proceed when there is a need to perform a physical read, as indicated by step S20. Once this occurs, the process will proceed to step S22, at which point a search will be performed for an available cache buffer which is the best candidate for performing a read. In performing the search in step S22, an unupdated table is searched from LRU to MRU. The unupdated table includes information pertaining to unupdated cache buffers, arranged in an LRU to MRU fashion. The unupdated table (sub-listing) is searched, in an LRU to MRU fashion, for an unupdated cache buffer that is not either active in an I/O, in use, updated, or in error.

Thereafter, as indicated in step S24, if the initial sub-listing search was unsuccessful, the destage table will be searched in an LRU to MRU fashion, for a cache buffer that is not either active in an I/O, in use, or in error, thus considering updated cache buffers as well as unupdated cache buffers. If an updated cache buffer is found, a forced write of that updated buffer will be performed.

2. Performing Drain Operations

Figure 9:
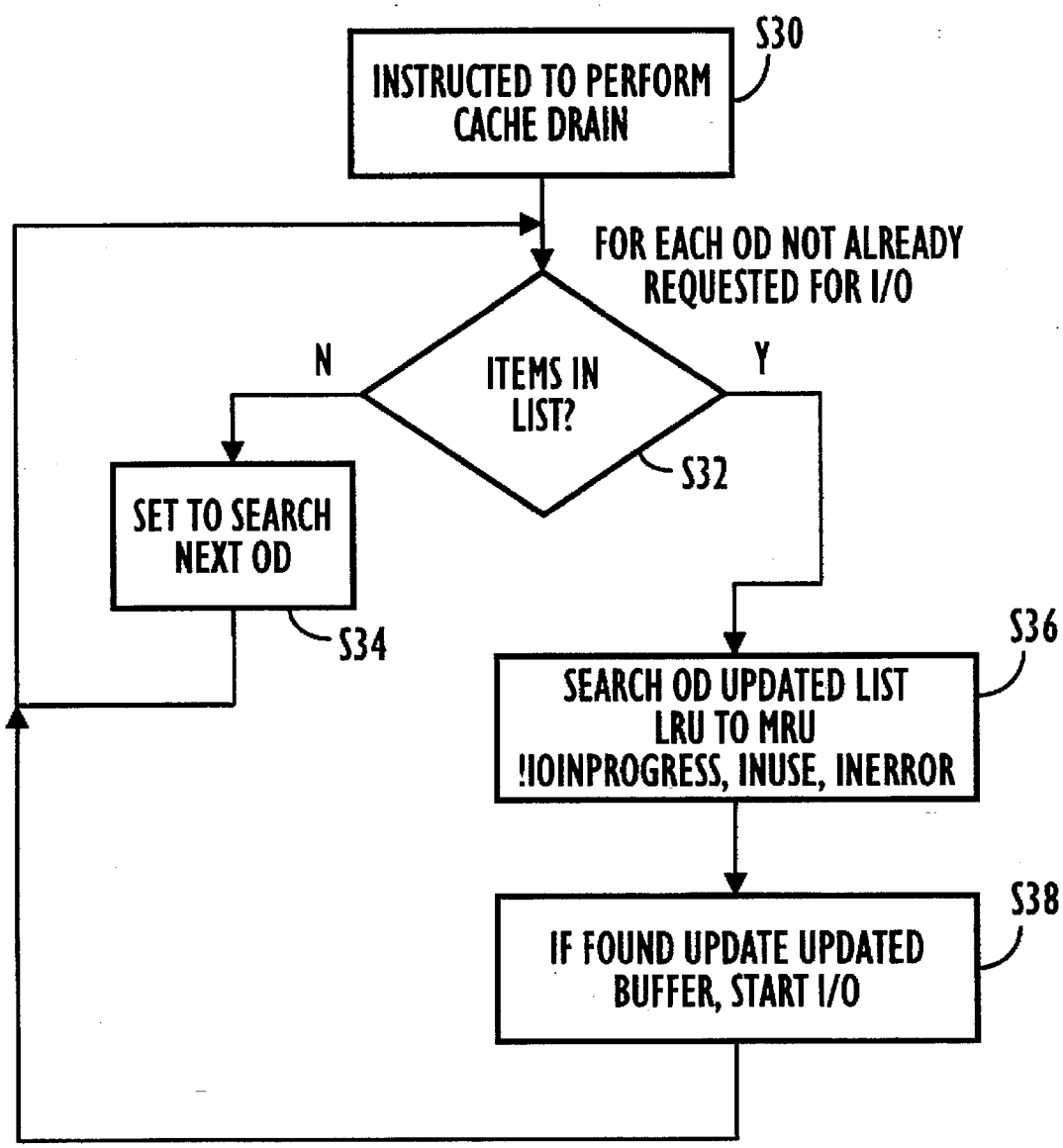
FIG. 9 illustrates the relevant processing for performing a drain of cache buffers from the cache to the target disks.
Figure 10:
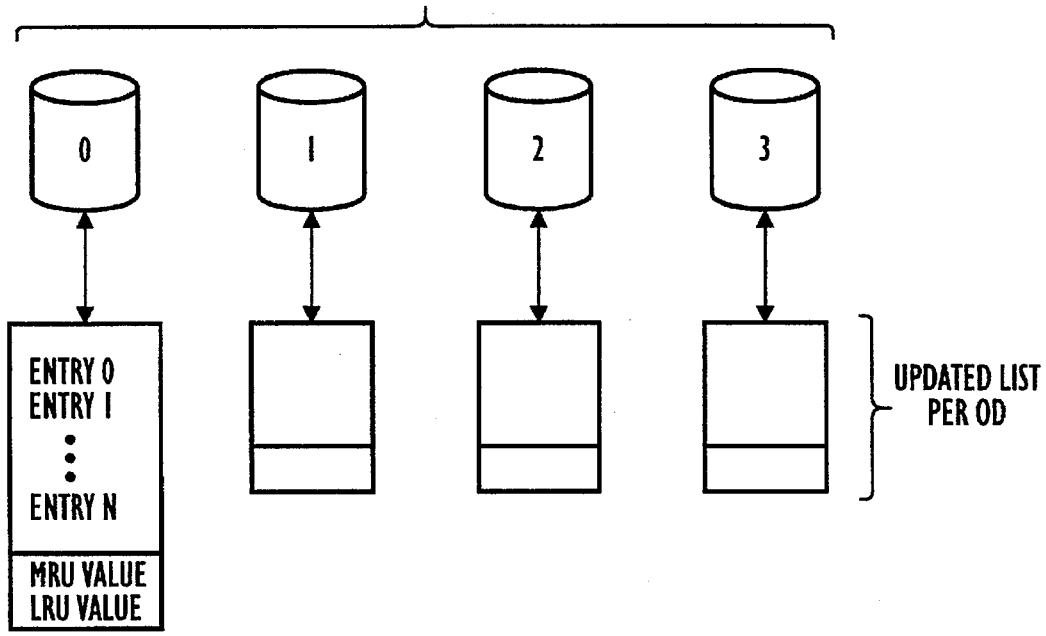
FIG. 10 illustrates updated table entries provided in a plurality of object disk (OD) updated lists.

If an I/O is instructed to perform a cache drain, then the process as illustrated in the flow chart of FIG. 9 may be performed, utilizing updated tables (sub-lists) as illustrated in FIG. 10.

As disclosed in parent application 08/053,655, a DoAsMuchIOAsICan routine may be performed in response to a drain-on-write, a drain, or a drain-on-read request. As disclosed in the parent application, in order to perform such drain operations, the drain mechanism would search the destage table, from LRU to MRU, in order to find an updated cache buffer that is not either performing an I/O, in use, or in error, for each target disk to be written to. Such a search would likely require a search of almost the complete destage table, which may include, e.g., 1000 or more entries.

In accordance with the illustrated efficient cache buffer lookup mechanism, cache drain operations may be performed as shown in the flow chart of FIG. 9, utilizing OD updated lists as shown in FIG. 10. Referring to FIG. 9, drain processing will commence upon being instructed to perform a cache drain as indicated in step S30. Once instructed to perform a cache drain, the cache drain process will execute the steps following step S30 for each object disk (OD) for which I/O has not already been requested. Accordingly, in step S32, for a first object disk, a determination is made as to whether or not there are any available updated cache buffers referred to in the object disk updated list for the first object disk.

The object disk updated lists each comprise a list of identification information pertaining to updated cache buffers that correspond to a particular object disk. Such object disk updated lists may be formed as illustrated in FIG. 10, each list comprising information to identify cache table entries (CTE's) arranged from MRU to LRU, with one updated list being provided for each object disk.

If there are updated cache buffers in the object disk updated list being searched, the drain process proceeds from step S32 to step S36, where the object disk (OD) updated list will be searched from LRU to MRU to identify updated cache buffer that is not either active in an I/O, in use, or in error. Thereafter in step S38, if an updated buffer was found, I/O for that buffer will be commenced. The process will then return to step S32 at which point the next object disk (OD) updated list for the next object disk to be written to will be searched. It is noted that once an updated buffer is found, in step S38, the I/O process for that buffer is commenced before starting to search a next object disk updated list.

In step S32, in determining whether there are any updated cache buffers in the object disk updated list, an initial LRU entry (provided within each object disk updated list) may be checked which indicates whether there are any updated cache buffers present in that list. Accordingly, in step S32, the cache drain processing may check the initial LRU entry, and immediately find out whether updated buffers are present in the object disk updated list.

If it is determined in step S32 that there are no updated buffers present in an object disk updated list, then the process proceeds from step S32 to step S34, where the updated list search will be set to the next object disk. The cache drain processing is then returned to step S32.

It is noted that the searches of the unupdated table may be performed under the constraints of configured parameters such as Cache_Read_Preserve_Percent and Cache_PreRead_Preserve_Percent Value, so that only a portion of each of the tables will be searched in order to perform a read or a pre-read to a particular cache buffer.

The cache drain buffer lookup mechanism shown in FIG. 9 results in a significant time savings when a large number of cache buffers are involved. In particular, the drain routine no longer needs to search through the cache until an I/O is initialized for each object disk or until all of the cache is search. Rather, by using the object disk updated list for each object disk, a minimal review of entries that are updated are reviewed, and those entries are written if not in use, not either active in an I/O, or if they are not in error. Since the list only contains updated cache entries, the resulting search is very small, no matter how many cache buffers there are. Further, the list is maintained in an LRU to MRU order, enabling proper selections for writing to be made. This results in a considerable improvement over the drain mechanism of parent application 08/053,655, and can be applied to the process for doing as much I/O as possible on the read, write, and trickle processing as described therein.

The OD updated list must be updated at appropriate places within the I/O main cache routine of the memory sub-system. Such an update of the code may be performed when setting up an I/O packet, setting new cache table values, setting the record updated flag, and in the ODIOThread, each of which are disclosed in more detail in parent application 08/053,655. In addition, if the I/O is in error, the list should be handled accordingly.

The code which would be provided for handling the OD updated link lists and the unupdated link list is typical linked list maintenance code. OD list entry number may be provided in the cache table entry (CTE) for each selected item, enabling it to be updated properly. Updated list entry numbers correspond to the cache table entry numbers, and thus do not have to be separately retained.

E. RAID 1 Implementation

Figure 11:
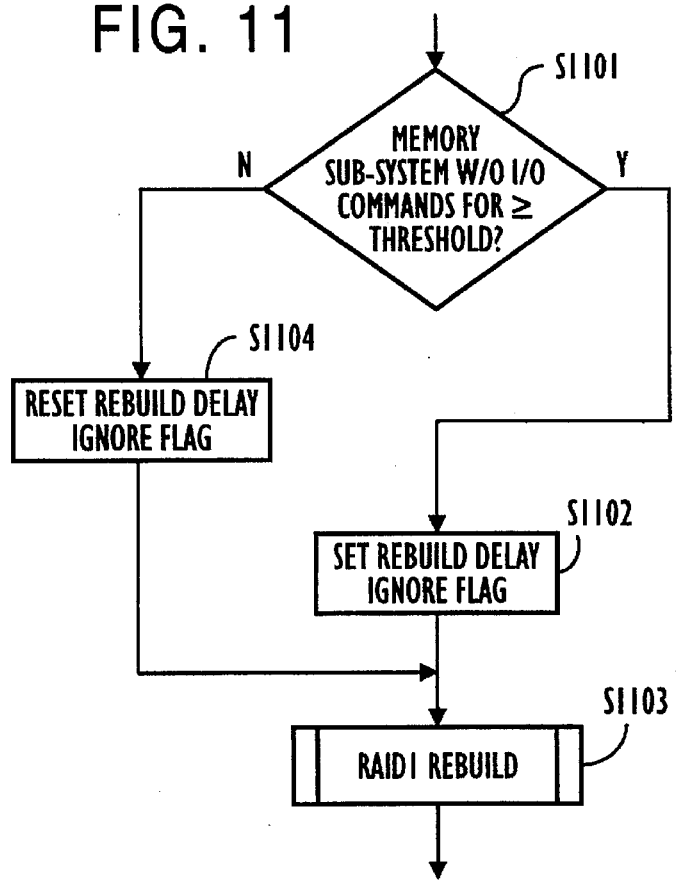
FIG. 11 is a flow diagram that illustrates the relevant portions of I/O processing for accelerating the rate at which a RAID 1 rebuild process is performed.

FIG. 11 is a flow diagram of the processing steps to be performed in relation to accelerating the performance of a RAID 1 rebuild operation. In a first step S1101, a determination is made as to whether the memory subsystem has processed any I/O commands for a certain minimum threshold amount of time. If a "yes" determination is made in step S1101, a Rebuild Delay Ignore flag is set in step S1102. Thereafter, a RAID 1 rebuild routine is performed in step S1103. If the noted flag is set, then the routine in step S1103 will ignore the rebuild delay time, and accordingly perform a rebuild as quickly as possible. Before proceeding from step S1101 directly to step S1103, the flag will be reset in step S1104.

Figure 12:
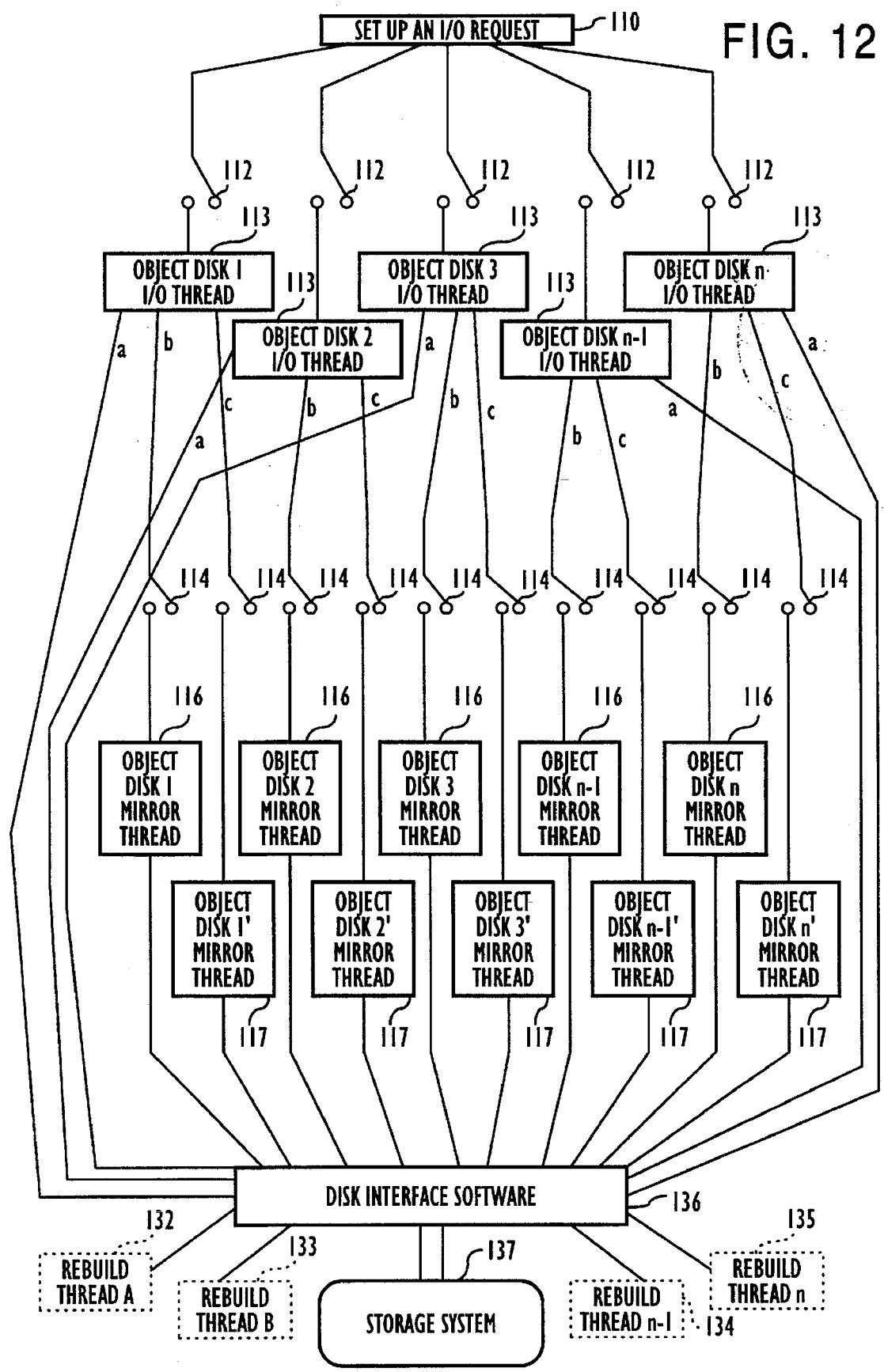
FIG. 12 is a system diagram that represents a memory sub-system and its components in a RAID 1 implementation.

FIG. 12 is a system block diagram which provides an overview of the respective modules of a memory sub-system which relate to a RAID 1 implementation. A module 10 for setting up an I/O request is connected to a plurality of object disk I/O threads 113 corresponding to each of the object disks of the memory sub-system, via a plurality of respective semaphore switches 112. Each of object disk I/O threads 113 are connected, via function lines "a", to a disk interface software module 136, and are further connected, via further semaphore switches 114, to respective pairs of object disk mirror threads 116 and 117, which are in turn connected to disk interface software module 136. A plurality of rebuild thread modules 132, 133, 134, and 135 are illustrated as being coupled to disk interface software module 136, each rebuild thread module being depicted by dotted lines, since these modules are only temporarily created in order to perform their function. Once a rebuild is completed, they are discarded. Disk interface software module 136 is coupled to the object disks indicated as storage system 137.

It is noted that the cache system will generate an I/O request via a setup I/O packet routine to perform a physical read or write, or a pre-read of data to/from the cache. Such a generation of an I/O request is portrayed by module 110. An I/O request will be received at module 10 which specifies an object disk number in a range from 0 to N/2-1, wherein N is the number of object disks actually present in the system. Thus, the I/O packets coming into the system only reference the first half of the disks that are physically present. The mirroring software assumes that there is a second equivalent set of object devices present which mirrors the first set exactly. A mechanism, not shown, is provided to ensure a synchronization and to ensure that initially the two disk sets are identical.

Key-ins may be provided to change the state of a mirrored disk. The previously-noted APS 7800 Release Documentation provides a description of such key-ins, and their relationship to a storage control sub-system with a RAID 1 implementation. The APS release documentation comprises further information regarding the configurable parameters which are related to disk mirroring, their usage, and rules regarding the same. Accordingly, as noted previously, the APS Release Documentation has been incorporated herein by reference in its entirety. The APS Release Documentation further includes information regarding the mirror recovery and tracking file, how to initialize mirrored disk sets, and how to ensure that the mirrored disk sets are synchronized.

Once an I/O request is established, the cache system will unlock the appropriate semaphore (one of semaphores 112) to allow an object disk I/O thread to be processed for the object disk specified in the request packet. The corresponding object disk I/O thread module 113 will in turn re-lock the semaphore to prevent the thread from being run again until it is unlocked.

Each object disk I/O thread 113 will check to see if mirroring is configured or not. If mirroring is configured, routes "b" and "c" (functional connections) in FIG. 12 will be utilized by each of the object disk I/O threads 113. In addition, respective object disk mirror thread pairs 116,117, corresponding to each object disk I/O thread 113, will be switched on to perform their appropriate I/O activity required to keep the disks synchronized. It is noted that "reads" only use the primary disks (b), while "writes" use the primary and secondary disks (b) and (c). The system may be implemented so that reads may alternate between primary and secondary disks. Such an implementation is not specifically described herein. If mirroring is not being used, as configured within the cache system, route "a" will be utilized by each of object disk I/O threads 113 to appropriately directly perform I/O to their corresponding desired object disks.

If mirroring is being used, one or two of switches 114 will be turned on in response to the initial I/O request, depending upon whether a read or write is to be performed. Switches 114 accordingly release semaphores in object disk mirror threads 116,117 for the primary and secondary disk pairs of the mirrored sets. These threads in turn invoke the I/O system just as routes "a" would, although errors and retries are handled differently. Each object disk mirror thread 116,117 accesses a single physical object disk.

When a disk rebuild (or initial build) is needed to resynchronize (or initially synchronize) mirrored pairs, a key-in can be performed to start this processing, which begins a rebuild thread 132, 133, 134 or 135, e.g., for each pair of disks that have to be rebuilt.

Accordingly, the write implementation may be configured so that it performs mirroring or does not perform mirroring, in accordance with configuration information, e.g., provided in a configuration file of the memory sub-system. The configurability of the subsystem to perform a disk mirroring adds to the flexibility of the overall system and has advantages in systems such as the APS 7800 memory sub-system, or the open architecture interface storage controller disclosed in related patent application Ser. No. 07/882,010, which was noted above.

Figure 13:
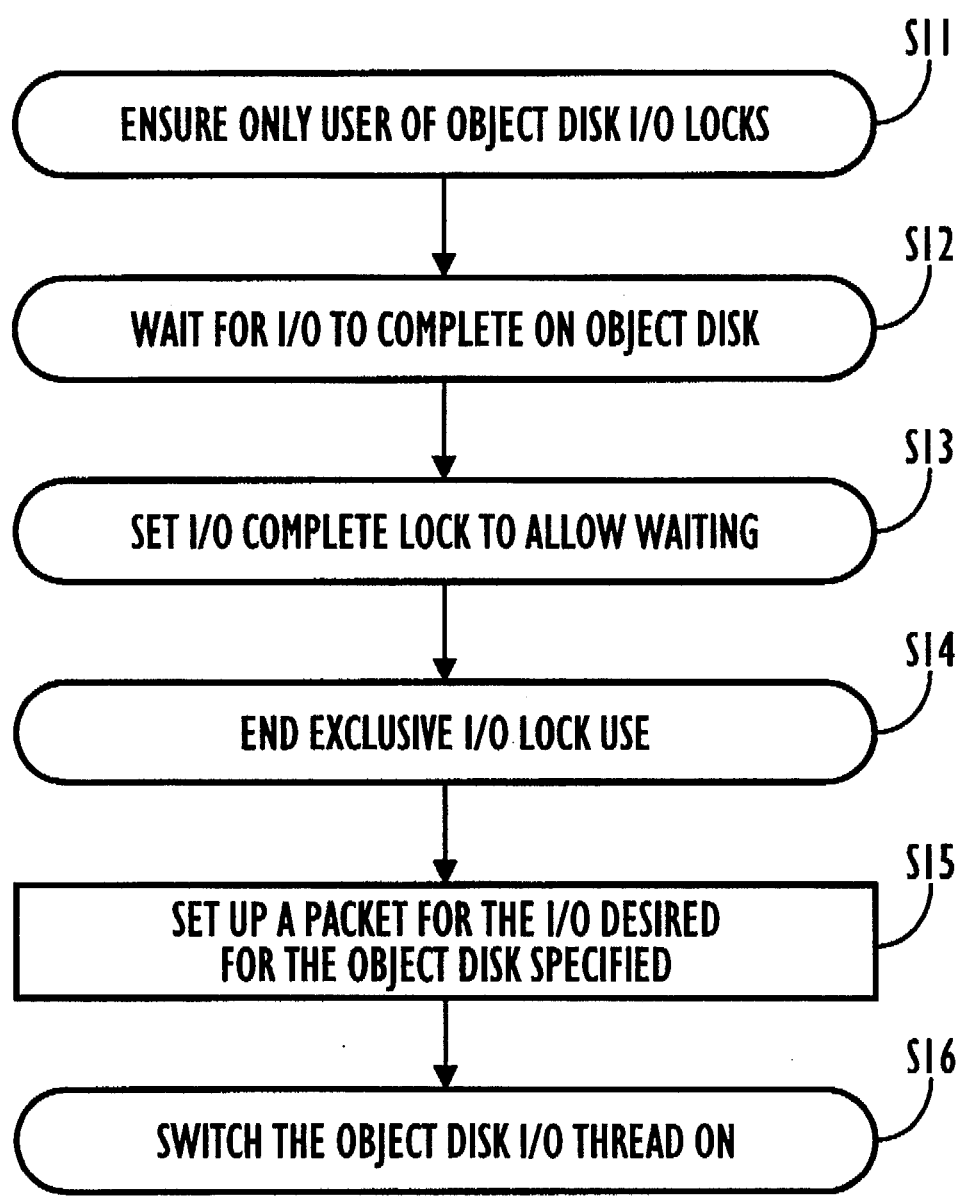
FIG. 13 is a flow diagram that illustrates a process for setting up an I/O request for the illustrated RAID 1 implementation.

FIG. 13 illustrates a process which may be performed to set up an I/O request, and thus corresponds to module 110 of FIG. 12. In a first step S11, the process ensures that it is the only user of the object disk, and locks onto that object disk accordingly. Thereafter, in step S12, the process will wait for I/O to complete on that object disk. In step S13, the process will set an I/O complete lock to allow waiting, and in step S14, the process will end the exclusive I/O lock use. Thereafter, in step S15, a packet will be set up for the I/O desired, for the object disk that has been specified. Thereafter, in step S16, the object disk I/O thread corresponding to the requested object disk will be switched ON. FIG. 14 illustrates an exemplary object disk I/O thread which may be utilized to implement object disk I/O threads 113 as illustrated in FIG. 12. In a first step S701, appropriate information will be initialized relating to the object disk I/O. Thereafter, in step S702, the process will wait until it is switched ON. That is, the object disk I/O thread will wait until a semaphore has been unlocked. Thereafter, in step S703, it will turn a switch back off to wait later. That is, it will again lock its semaphore. Thereafter in step S704, the process will prepare for I/O request processing. Proceeding to step S705, a determination is made as to whether to not mirroring (RAID 1) is configured to be ON. If mirroring is configured to be ON, the process will proceed from step S705 to step S707 wherein a mirror I/O routine will be invoked. Otherwise, the process will proceed from step S705 to step S706 where standard disk interface software will be invoked. Once either of steps S706 or S707 is performed, the process will proceed to step S708, wherein any errors will be handled, and the process will terminate if needed.

In step S709, the flags indicating I/O completion will be cleared. Thereafter, in step S710, a completion semaphore will be posted. The process will then return to step S702, wherein the object disk I/O thread will wait until it is switched on, i.e., wait until the appropriate semaphore has been cleared.

FIGS. 15A–15E illustrate a mirror I/O routine which may be performed in connection with the RAID 1 implementation illustrated in FIG. 12. In a first step of the mirror I/O routine, step S750, the process will ensure that it has control of the object disk pair. Thereafter, in step S751, the process will reset a retry counter for the I/O retries. In step S752, the process will bump the retry (try) counter. Thereafter, a determination will be made in step S753 as to whether a read has been requested. If a read request has been made, the process will proceed from step S753 to S754, wherein a further determination is made as to whether or not this is the first try. If yes, the process proceeds to step S755, where a determination is made as to whether the primary disk is good. If the primary disk is good, the process proceeds to step S762 at which point the good disk will be used. If the primary disk is not good, the process proceeds from step S755 to step S756, where a determination is made as to whether a secondary disk is good. If the secondary disk is good, the process proceeds to step S762. If not, the process proceeds to step S757 where the lock is cleared and the process returns with an error indication.

If it is determined as step S754 that the present read try is not the first try, the process proceeds to step S758, where a test is made as to whether or not the present try is the fourth try. If it is the fourth try, the process proceeds to step S759, where the disk being used is marked as bad. Thereafter, a determination is made at step S760 as to whether or not the secondary disk was used for the I/O (i.e., marked). If it was marked, the process proceeds from step S760 to step S757. If the secondary disk was not marked, the process proceeds to S761 where a determination is made as to whether or not the primary disk is good. If it is good, the process proceeds to step S762. If the primary disk is not good, the process proceeds to S764 which is shown on the top of FIG. 15B.

Figure 15A:
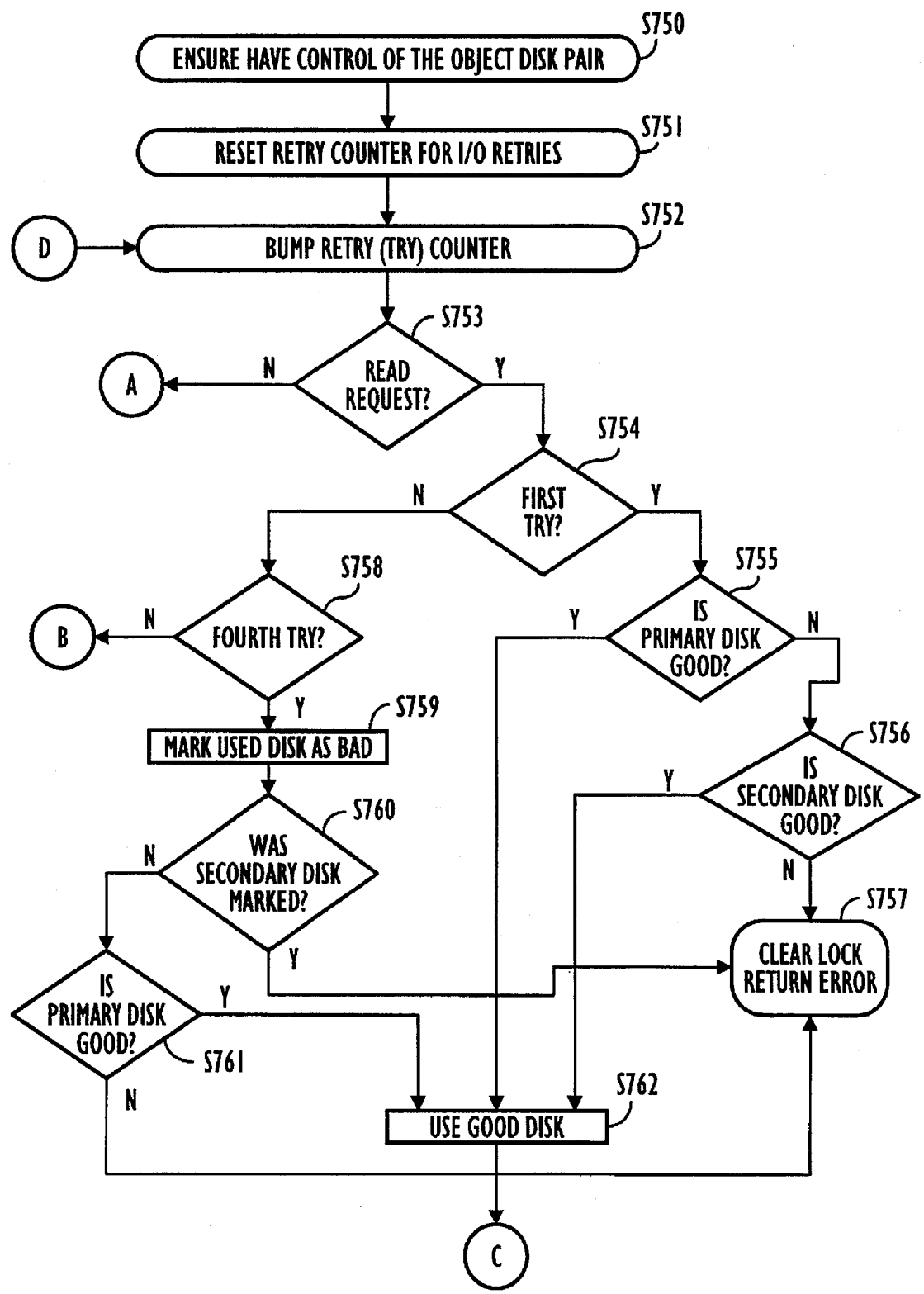
FIGS. 15A–15E represent a flow diagram that illustrates a mirror I/O routine which may be provided in the illustrated RAID 1 implementation.
Figure 15B:
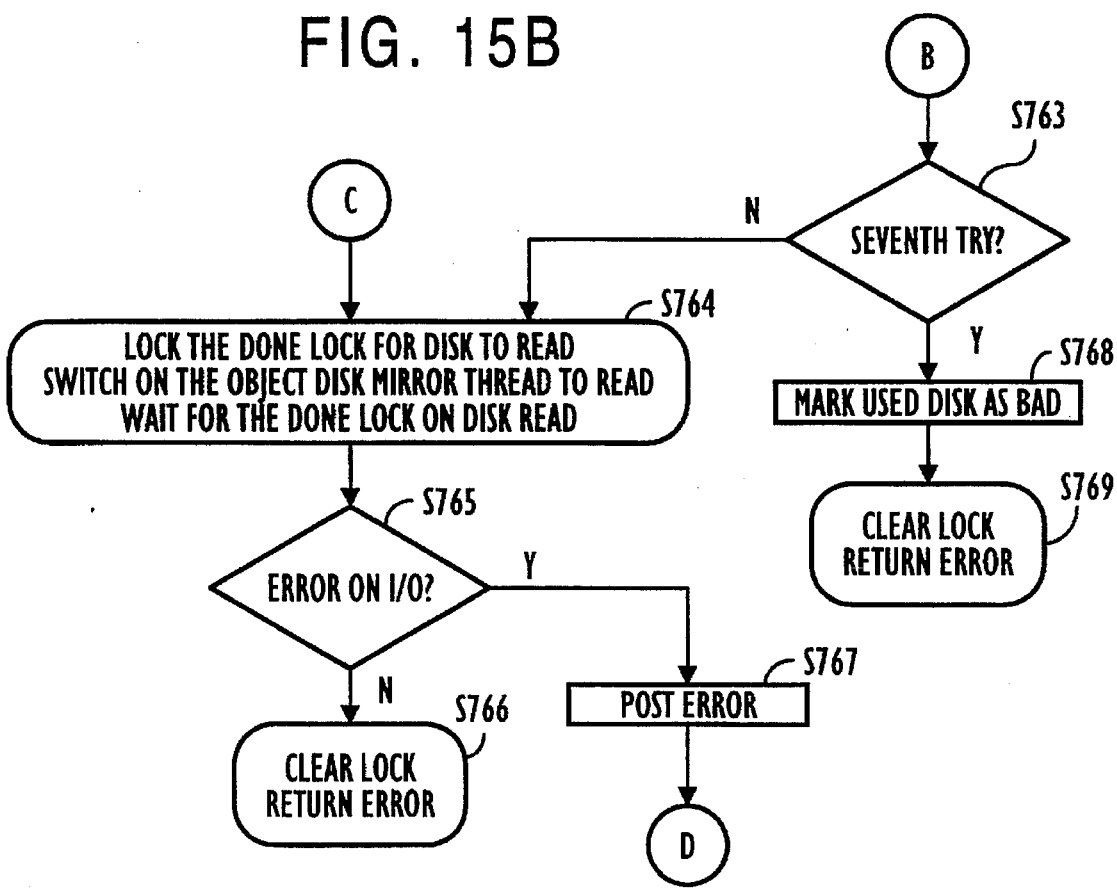
Figure 15C:
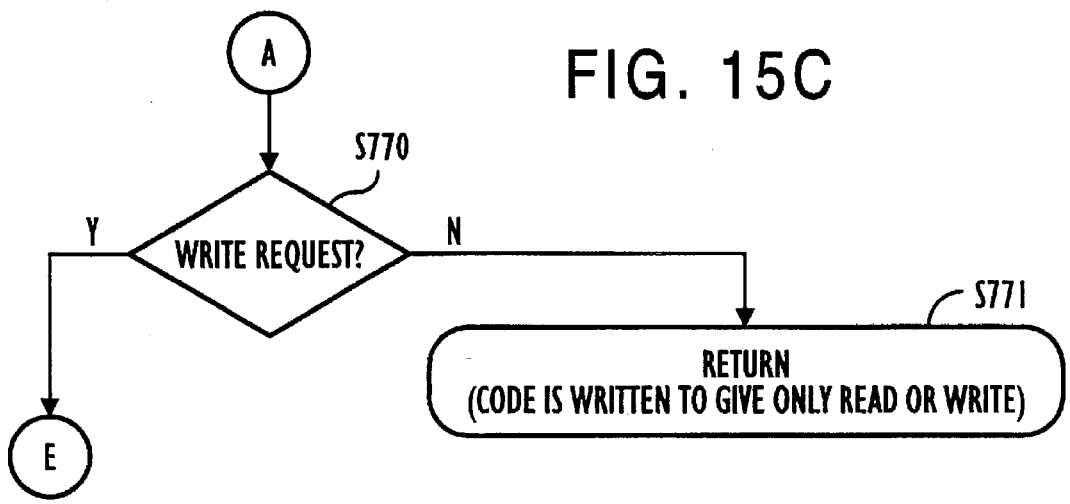
Figure 15D:
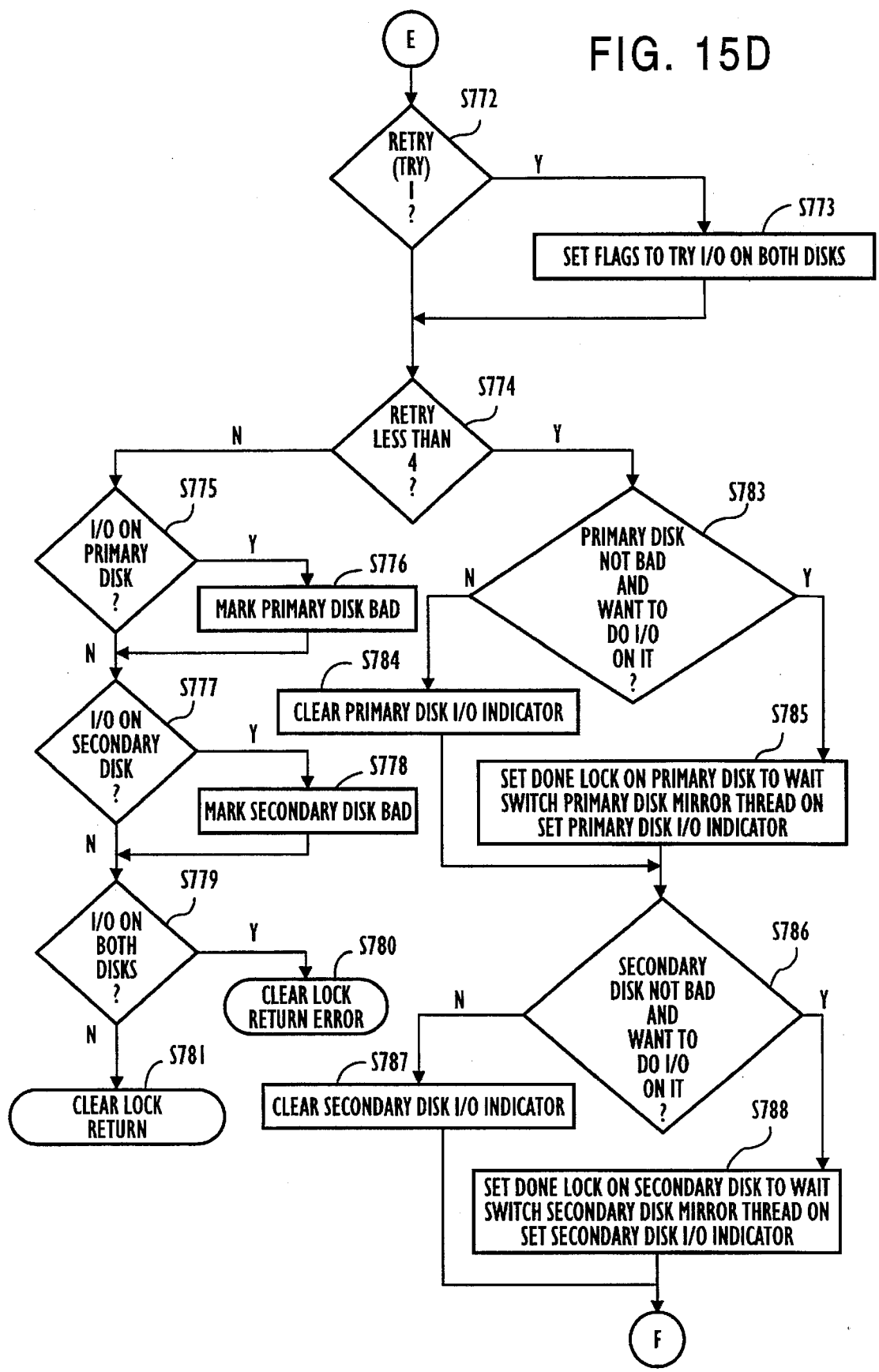

If it is determined at the determination step S753 that the present request is not a read request, the process proceeds from step S753 to step S770 which is shown in FIG. 15C. Then, a determination is made in step S770 as to whether or not a write request has been made. If not, the process proceeds directly to step S771, wherein the mirror I/O routine will return. If a write request has been made, the process will proceed to step S772 (via connector E) which is shown at the top of FIG. 15D.

If it is determined at step S758, that the present try is not the fourth try, then the process proceeds (via connector B) directly to step S763 which is at the top of FIG. 15B, wherein a determination is made as to whether or not the present try is the seventh try. If it is the seventh try, the process proceeds to step S768, wherein the used disk is marked as bad. Subsequently, in step S769, the lock is cleared and the process returns with an error indication. If the present try is not the seventh try as determined in step S763, the process proceeds directly to step S764.

In step S764, the process will lock the Done Lock for the disk to read, switch on the object disk mirror thread to read, and wait for the Done Lock on disk read.

Thereafter, in step S765, a determination is made as to whether or not there is an error in performing the I/O. If there is an error, the process proceeds to step S767, wherein the error is posted, and the process subsequently returns to step S752 shown in FIG. 15A. If there was not an error in performing the I/O as determined in step S765, the process proceeds directly to step S766, wherein the lock is cleared, and the process returns with a good indication.

Figure 15E:
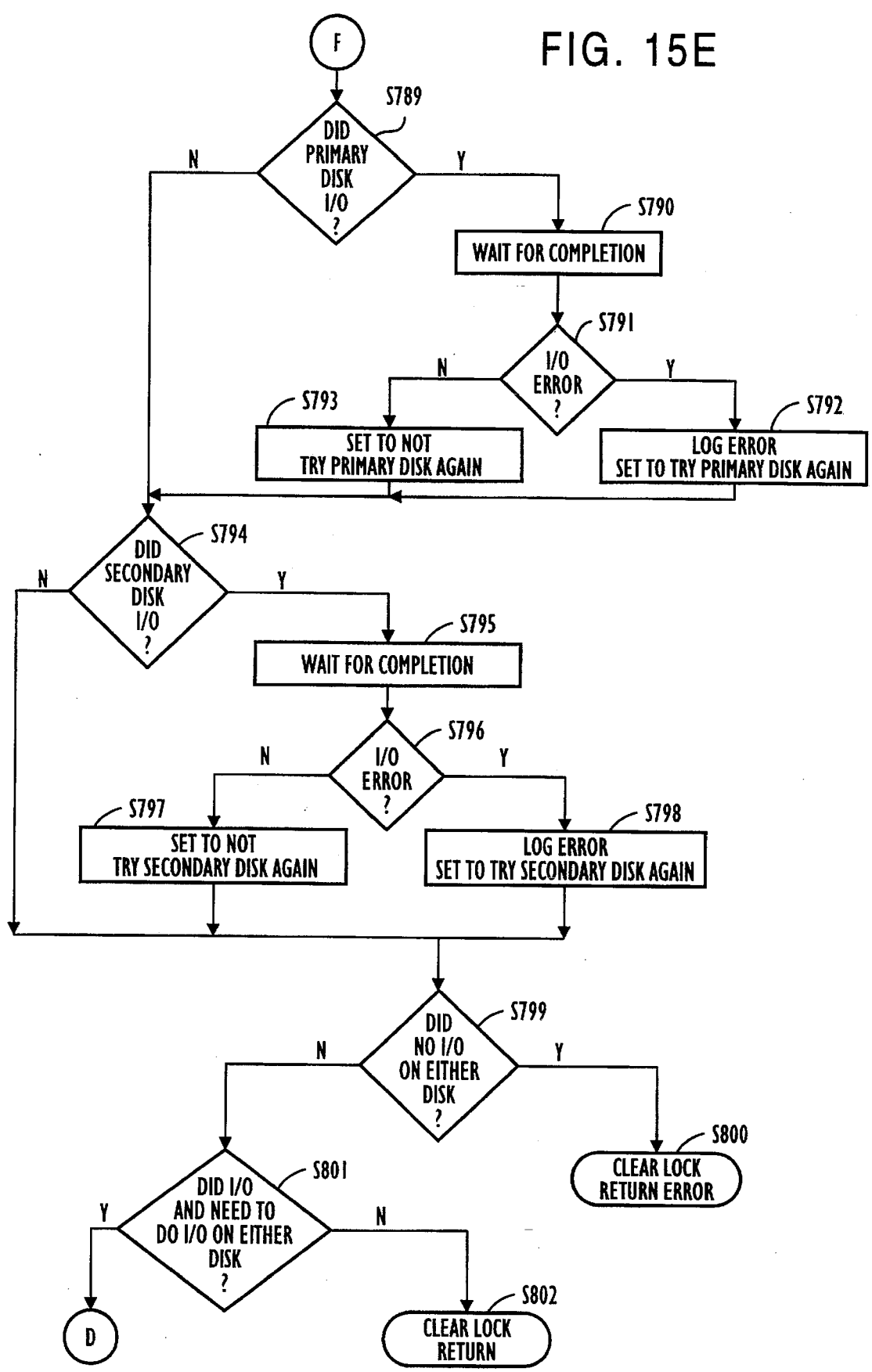

If a write request was received by the mirror I/O routine, step S772 (top of FIG. 15D) will be performed which includes a determination as to whether or not the present try is a first retry (try) 1. If yes, the process proceeds to step S773, where the flags are set to try I/O on both disks. If a no determination is made, the process proceeds directly to step S774, wherein a determination is made as to whether or not the retry is less than four. If it is less than four, the process proceeds to step S783, wherein a determination is made as to whether the primary disk is not bad and the process wants to do I/O on the primary disk. If a yes determination is made in step S783, the process proceeds to step S785 where the Done Lock is set on the primary disk to wait, the primary disk mirror thread is switched on, and the primary disk I/O indicator is set. If a no determination is made in step S783, the process proceeds to step S784, wherein the primary disk I/O indicator is cleared, subsequently moving on to step S786 which comprises a determination as to whether the secondary disk is not bad and the process wants to do I/O on that disk. Processing similar to steps S784 and S785 may then be performed, based upon whether the determination is a yes or a no, in steps S787 and S788. The process then proceeds to step S789 (via connector F) which is shown at the top of FIG. 15E.

If it is determined at step S774 that the retry is not less than four, the process proceeds to step S775, wherein a determination is made as to whether or not I/O is on the primary disk. If yes, the primary disk will be marked bad in step S776. If no, a determination is made in step S777 as to whether I/O is being performed on a secondary disk. If yes, the secondary disk will be marked bad in step S778. Otherwise, the process will proceed directly to step S779, wherein a determination is made as to whether I/O is being performed on both disks. If yes, in step S780, the lock return is cleared, and the process returns with an error indication. If it is determined that I/O is not being performed on both disks in step S779, the process proceeds directly to step S781, wherein the lock is cleared, and the process returns.

In step S789 (top of FIG. 15E), a determination is made as to whether or not the primary disk is performing I/O. If the determination is a "yes", the process proceeds to step S790 at which point the process will wait for a completion of the I/O. Thereafter, in step S791, a determination is made as to whether or not the I/O has had an error. If an I/O error did occur, the process proceeds to step S792, wherein the error will be logged and the primary disk will be set so that it is tried again. If there is no I/O error, the process proceeds to step S793 and a flag will be set so that the process does not try the primary disk again. Thereafter, the process proceeds directly to step S794 where a determination is made as to whether or not I/O is performed on the secondary disk. If a yes determination is made, in step S795, the process will wait for completion of the I/O, and will perform an I/O error-related processing step S796, and either of steps S797 and step S798. The process will then perform step S799, wherein a determination is made as to whether no I/O on either disk was performed. If this is true, the process proceeds to step S800, wherein the lock is cleared and the process returns with an error indication. Otherwise, the process proceeds from step S799 to step S801 wherein a determination is made as to whether or not I/O was performed and the process needs to perform I/O on either disk. If "no", the process proceeds to step S802, wherein the lock is cleared, and the process returns. Otherwise, the process returns to step S752 (via connector D) shown in FIG. 15A.

Figure 16:
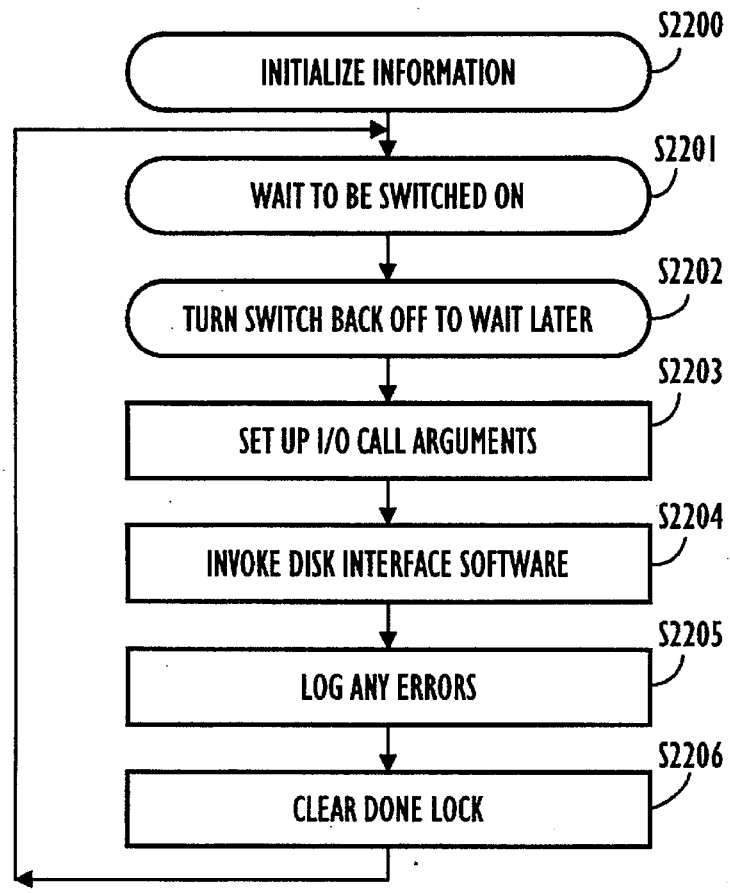
FIG. 16 is a flow diagram that illustrates an object disk mirror thread which may be provided in the illustrated RAID 1 implementation.

FIG. 16 illustrates an object disk mirror thread which may be utilized in the RAID 1 implementation illustrated in FIG. 12. In a first step S2200, appropriate information related to the object disk mirror thread is initialized. Thereafter, in step S2201, the process will wait until it is switched on (the thread's semaphore will be unlocked). In step S2202, the switch (semaphore) will be turned back off (locked). Thereafter, in step S2203, the process will set up the I/O Call arguments. In step S2204, disk interface software will be invoked. In step S2205, errors will be logged, and in step S2206, the Done lock will be cleared. Thereafter, the process will return to step S2201.

Figure 17:
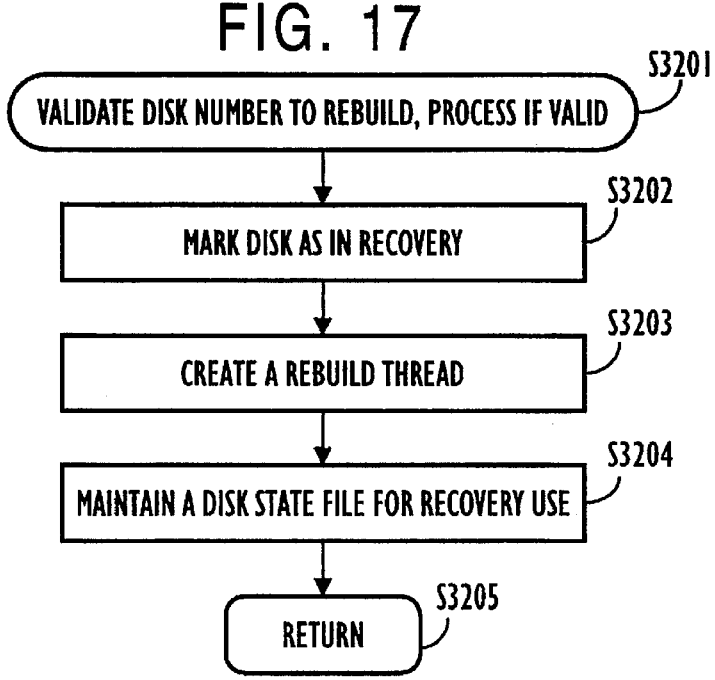
FIG. 17 is a flow diagram that illustrates a rebuild thread creation routine that may be provided in the illustrated RAID 1 implementation.

As noted previously, when performing a RAID 1 rebuild operation, a rebuild thread is created. FIG. 17 is a flow diagram which illustrates a process for creating a rebuild thread. In a first step S3201, the process validates the disk number to be rebuilt, and proceeds to process the disk if it is a valid disk number. Thereafter, in step S3202, the disk will be marked as in recovery. After marking the disk, in the next step S3203, a temporary rebuild thread is created. Then, in step S3204, a disk state file is maintained for recovery use. Thereafter, the process returns in step S3205.

Figure 18:
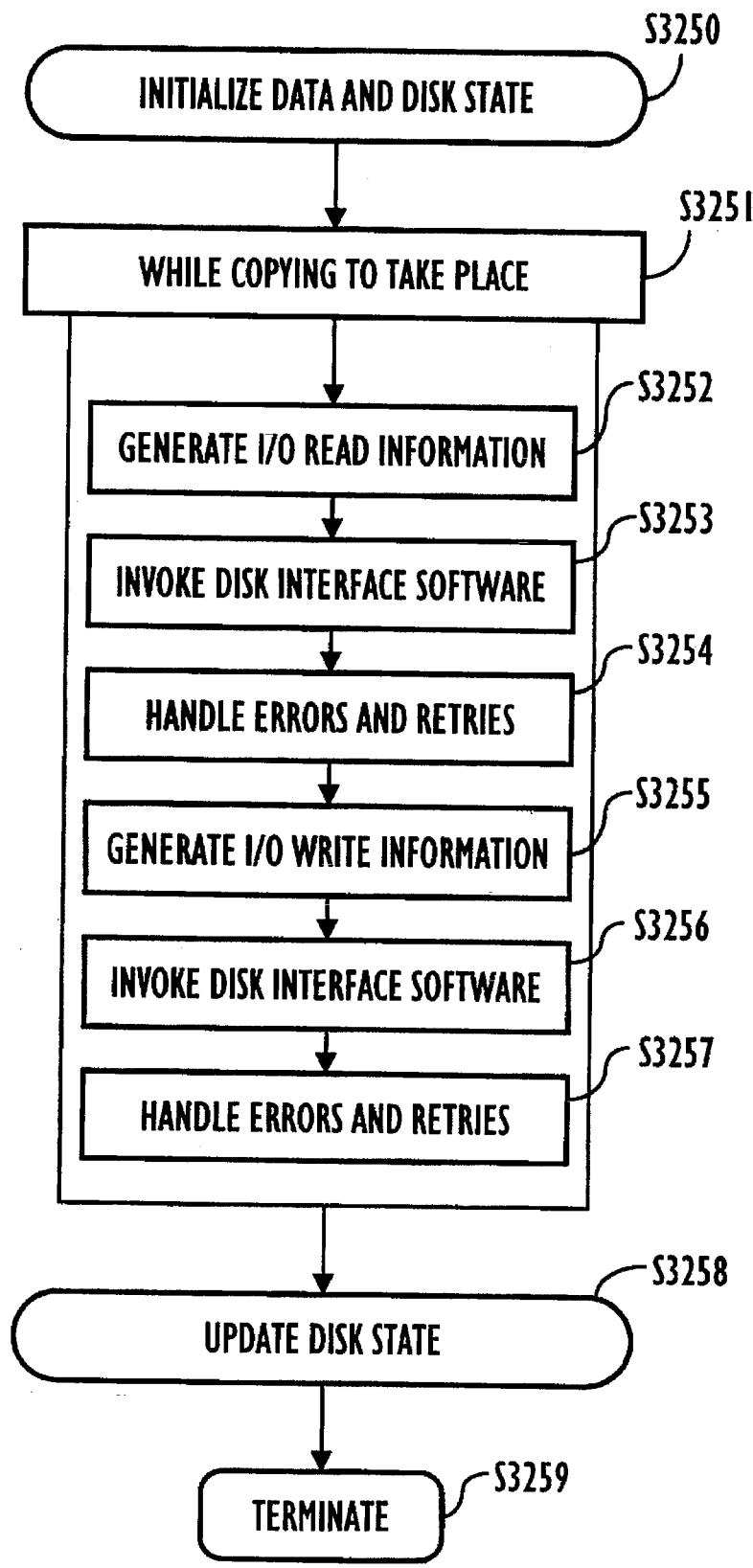
FIG. 18 is a flow diagram that illustrates a rebuild thread that may be provided in the illustrated RAID 1 implementation.

FIG. 18 is a flow diagram which represents a temporary rebuild thread. In a first step S3250, appropriate data and the disk state are initialized. In step S3251, while copying is taking place, each of steps S3252–S3257 is performed. In step S3252, I/O read information is generated. Thereafter, in step S3253, disk interface software is invoked. In step S3254, errors and retries are handled. In step S3255, I/O write information is generated. In step S3256, disk interface software is invoked. In step S3257, any errors and retries are handled. After step S3251, which includes processing steps S3252–S3257, the process proceeds to step S3258, at which point the disk state will be updated. Thereafter, the process will terminate in step S3259.

A further discussion of RAID technology is provided in a paper entitled "A Discussion of RAID Technology" ©1992 DynaTek Automation Systems, Inc., ©1991 Integra Technologies, Inc., which is expressly incorporated by reference herein in its entirety.

A number of features may be provided in relation to the various subsystems and mechanisms disclosed herein, e.g., in order to implement the same within a particular environment, and/or in order to further enhance the same.

Several source code listings are provided in Appendices attached hereto, which may comprise specific implementations of various mechanisms disclosed herein. The object disk updated list may be used to drain cache via a DoAsMuchAsIOAsICan routine as provided in Appendix C. The unupdated table may be used to locate a cache entry to use when a read is performed, in the TossUnUpdatedDTItem routine which is provided in Appendix G. Structure definitions relating to the object list updated list and the unupdated table may be found in Appendix F. The code in Appendix D shows how an item may be linked into the object list updated list for a given object disk with a LinkUpdatedODList routine. Appendix E shows how an item may be un-linked from the OD updated list for a given object disk, using a UnlinkUnUpdatedODList routine.

Appendix H includes a LinkUnUpdatedAtMRU routine which may be used to link an item to an unupdated list when it becomes unupdated. Appendix I includes an UnLinkUnUpdated routine which may be used to unlink an item from the unupdated list when it becomes updated.

Appendix J includes an idle detection routine which may be utilized to implement the processes illustrated in FIGS. 2 and 11 in order to accelerate the drain of cache buffers and accelerate the performance of a RAID 1 rebuild process, when it is determined that the storage control processor/memory subsystem has not been processing any I/O commands initiated by the requester for a predetermined threshold amount of time.

An idle detection routine may be provided in the memory sub-system (illustrated in FIG. 1), which corresponds to the processes illustrated in FIGS. 2 and 11. Such a routine may be provided to efficiently keep cache drained and to drain cache rapidly when a shutdown of the sub-system is pending. This is especially useful if a short-life UPS is used to back up the storage system, allowing the cache to drain quickly and automatically once I/O requests cease arriving from the connected host system. The code which may be provided to perform the idle detection routine is in Appendix J, and represents a separate thread of processing.

The code in Appendix J also comprises other processing abilities. A DEBUG_COUNTER_1 value is incremented outside of the cache system whenever a new command is received by the connected processing software, such as APS 7800 software. Hence, it is changed whenever there is traffic to the system. DataHook calls is another externally maintained counter of accesses to the cache system via an APS 7800 DataHook feature. Reference may be made to the previously-mentioned APS Release Documentation, which has accordingly been incorporated herein by reference in its entirety. Line 27 of the code in Appendix J shows a DosSleep call. This waits at least three seconds. Immediately before this wait, the values from the two identified counters are stored off. After the delay time, the saved and current values of those counters are compared. If either has changed, the dynamic sleep time is re-asserted and the delay time values are rebuilt as they were prior to any possible modification by the idle detection routine. If, however, it is determined at line 34 that neither value has changed for three seconds, the cache system will be set to minimize mirror disk rebuild delay time to 0 and to set the dynamic sleep time to 0. Hence, if the system has been idle for a while (relative to incoming requests) background tasks are performed involving I/O as fast as the system can perform them.

At line 50 of the code in Appendix J, the process will wait 10 seconds after refreshing the values, in case the (dynamically alterable) tuning parameter was changed. Additional hung channel detection, specific to the APS 7800 implementation, takes place at line 70 of the code in Appendix J. At line 72, the routine will return to the top.

While the invention has been described herein with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials and embodiments, it is understood that the invention is not to be limited to the particulars disclosed herein, and that the invention extends to all equivalent structures, methods and uses, such as are within the scope of the appended claims.

APPENDIX A

```
1   void InitDiskMap(void)
2   {
3       UINT TrackOffset;
4       UINT i;
5
6       /* Code for revised meshmap information */
7       UINT j;
8
9
10      if(Config.File.SCSI_Controller_Mesh == 0)           /*-167-*/
11          for(i=0;i<Config.File.SCSI_Num_Disks;i++)
12              ControllerMeshDisk[i]=i;
13      else
14          for(i=0;i<Config.File.SCSI_Num_Disks;i++)
15              ControllerMeshDisk[i]=
16                  (i%Config.File.SCSI_Controller_Mesh) *
17                  ((Config.File.SCSI_Num_Disks-1)/
18                  Config.File.SCSI_Controller_Mesh) +
19                  (i/Config.File.SCSI_Controller_Mesh) +
20                  (i%Config.File.SCSI_Controller_Mesh);
21
22      TempHandle=LogStart();
23      fprintf(TempHandle,"\n Controller Mesh setting of %d with %d disks"
24                  "\n resulted in the following re-arrangement of SCSI devices:",
25                  Config.File.SCSI_Controller_Mesh,Config.File.SCSI_Num_Disks);
26      for(i=0;i<Config.File.SCSI_Num_Disks;i++)
27          fprintf(TempHandle,"\n SCSI Disk %2d is now mapped to SCSI Disk %2d",
28                  i,ControllerMeshDisk[i]);
29      Logstop();
30
31      Map.UnmeshedStartSCSIDisk[0]=0;
32      Map.UnmeshedStartSCSIOffset[0]=0;
33
34
```

© Southwestern Bell Technology Resources, Inc. 1992-1994                     Page 1

APPENDIX A

```
35  /*-----------------------------------------------------------------*/
36  /* Finding offset determinations for MF disks onto Linear Target Disks */
37  /*-----------------------------------------------------------------*/
38  TempHandle=LogStart();
39  fprintf(TempHandle," Starting locations of each MF Disk into unmeshed linear map.");
40  fprintf(TempHandle,"\nUNMESHED MF# %2.2d Starts at OD# %2.2d ODO %8.8d",
41  0,0,0);
42
43  for(i=1;i<Config.File.MF_Num_Disks;i++)
44  {
45
46
47      TrackOffset=(Map.UnmeshedStartSCSIOffset[i-1]/
48          Config.File.SCSI_Sectors_Per_MF_Track) +
49          NumTracksPerMFDisk;
50      Map.UnmeshedStartSCSIDisk[i]=Map.UnmeshedStartSCSIDisk[i-1];
51      if(TrackOffset >= Config.Calc.TracksPerObjectDisk)
52      {
53          Map.UnmeshedStartSCSIDisk[i]+=TrackOffset/
54              Config.Calc.TracksPerObjectDisk;
55          Map.UnmeshedStartSCSIOffset[i]=(TrackOffset %
56              Config.Calc.TracksPerObjectDisk) *
57              Config.File.SCSI_Sectors_Per_MF_Track;
58      }
59      else
60      {
61          Map.UnmeshedStartSCSIOffset[i]=TrackOffset *
62              Config.File.SCSI_Sectors_Per_MF_Track;
63      }
64      fprintf(TempHandle,"\nUNMESHED MF# %2.2d Starts at OD# %2.2d   ODO %8.8d",
65          i,Map.UnmeshedStartSCSIDisk[i],Map.UnmeshedStartSCSIOffset[i]);
66  }
67  LogStop();
68  /*-----------------------------------------------------------------*/
69
```

© Southwestern Bell Technology Resources, Inc. 1992-1994

```
70  /* Finding sizes and offsets for the start of each linear disk
71     on each physical meshed disk */
72
73
74   Meshing.Base=(Config.Calc.TracksPerObjectDisk /
75       Config.File.SCSI_Mesh_Factor) *
76       Config.File.SCSI_Sectors_Per_MF_Track;
77   Meshing.Remainder=Config.Calc.TracksPerObjectDisk %
78       Config.File.SCSI_Mesh_Factor;
79
80
81
82
83   TempHandle=LogStart();
84   fprintf(TempHandle,"\nBase=%4.4d",Meshing.Base);
85   fprintf(TempHandle,"\nRmdr=%4.4d",Meshing.Remainder);
86   for(i=0;i<Config.File.SCSI_Mesh_Factor;i++)
87   {
88       Meshing.Template[i]=Meshing.Base;
89       if(i<Meshing.Remainder)
90           Meshing.Template[i]+=Config.File.SCSI_Sectors_Per_MF_Track;
91       /* spread the overage */
92       fprintf(TempHandle,"\nTemplate[%2.2d] = %4.4d",i,Meshing.Template[i]);
93   }
94   LogStop();
95
96   /* now find the size used for each linear disk's allocation on each
97      meshed disk and get the offset at which it's allocation begins
98      on meshed disks based on size and offset of prior linear disk's space */
99   TempHandle=LogStart();
100  for(j=0;j<Config.File.SCSI_Mesh_Factor;j++)   /* each meshed disk linear 0 */
101  {
102      Meshing.Linear[0].Meshed[j].Size=Meshing.Template[j];
103      Meshing.Linear[0].Meshed[j].Offset=0;
104      fprintf(TempHandle,"\n Linear 0 on Meshed %d Size is %d Offset is %d",j,
```

© Southwestern Bell Technology Resources, Inc. 1992-1994

APPENDIX A

```
105      Meshing.Linear[0].Meshed[j].Size,
106      Meshing.Linear[0].Meshed[j].Offset);
107    }
108
109    for(i=1;i<Config.File.SCSI_Mesh_Factor;i++)  /* each linear per set */
110    {
111      UINT k=0;
112      for(j=1;j<i+Config.File.SCSI_Mesh_Factor;j++)  /* each meshed per set */
113        Meshing.Linear[i].Meshed[j%Config.File.SCSI_Mesh_Factor].Size=
114          Meshing.Template[k++];
115    }
116    for(i=1;i<Config.File.SCSI_Mesh_Factor;i++)  /* each linear per set */
117      for(j=0;j<Config.File.SCSI_Mesh_Factor;j++)  /* each meshed per set */
118      {
119        Meshing.Linear[i].Meshed[j].Offset=
120          Meshing.Linear[i-1].Meshed[j].Size;
121        Meshing.Linear[i].Meshed[j].Offset+
122    fprintf(TempHandle,"\n Linear %d on Meshed %d Size is %d Offset is %d",i,j,
123      Meshing.Linear[i].Meshed[j].Size,
124      Meshing.Linear[i].Meshed[j].Offset);
125      }
126    LogStop();
127  }
```

© Southwestern Bell Technology Resources, Inc. 1992-1994

Page 4

APPENDIX B

```
1    void GetObjectDiskAddress(MFDisk,Cylinder,Head,SCSIDisk,SCSIOffset,
2        UnmeshedDisk,UnmeshedOffset)
3    UINT MFDisk;
4    UINT Cylinder;
5    UINT Head;
6    UINT * SCSIDisk;
7    UINT * SCSIOffset;
8    UINT * UnmeshedDisk;
9    UINT * UnmeshedOffset;
10   {
11
12   UINT TempOffset;
13   UINT TempSCSIDisk;
14   TempOffset=(Map.UnmeshedStartSCSIOffset[MFDisk]/
15       Config.File.SCSI_Sectors_Per_MF_Track) +
16       (Cylinder * HeadsPerCyl)
17       + Head;
18   *UnmeshedOffset=(TempOffset%Config.Calc.TracksPerObjectDisk) *
19       Config.File.SCSI_Sectors_Per_MF_Track;
20   *UnmeshedDisk=Map.UnmeshedStartSCSIDisk[MFDisk] +
21       (TempOffset/Config.Calc.TracksPerObjectDisk);
22
23   /* Now, mesh them */
24   /* get meshed disk number relative to the set */
25   *SCSIDisk=(( (*UnmeshedOffset/Config.File.SCSI_Sectors_Per_MF_Track) +
26       *UnmeshedDisk)%Config.File.SCSI_Mesh_Factor)
27       + /* add in the set offset */
28       ((*UnmeshedDisk/Config.File.SCSI_Mesh_Factor) *
29       Config.File.SCSI_Mesh_Factor);
30   *SCSIOffset=Meshing.Linear[
31       (*UnmeshedDisk%Config.File.SCSI_Mesh_Factor)
32       ].Meshed[
33       (*SCSIDisk%Config.File.SCSI_Mesh_Factor)
         ].Offset +
```

© Southwestern Bell Technology Resources, Inc. 1992-1994

APPENDIX B

```
34   ((((*UnmeshedOffset/Config.File.SCSI_Sectors_Per_MF_Track)/
35     Config.File.SCSI_Mesh_Factor)
36     *Config.File.SCSI_Sectors_Per_MF_Track);/*-158-*/
37
38   TempSCSIDisk=ControllerMeshDisk[*SCSIDisk];/*-167-*/
39   *SCSIDisk=TempSCSIDisk;
40   )
41
```

© Southwestern Bell Technology Resources, Inc. 1992-1994

Page 2

APPENDIX C

```
1   void DoAsMuchIOAsICan(INT AvoidMe)
2   /* My job is to go from LRU to MRU and issue a write for as much as
3      one buffer that was updated and is not in use for each OD that does
4      not already have a request for this round in progress.  I must also
5      clear the updated flag for the buffer.  I get to fire off the I/O
6      routine but do NOT WAIT for completion.  Whoever called me
7      get's to do that.  HASH and DT are locked.  */
8   {
9       INT TempIndex;
10      INT i;
11      ULONG PostCountPtr;/*-124-*/
12
13      DosRequestMutexSem(ODLinkLock,SEM_INDEFINITE_WAIT);/*-338-*/
14
15      for(i=0;i<Config.File.SCSI_Num_Disks;i++)
16      {
17          if(i!=AvoidMe)
18          {
19              TempIndex=ODUpdatedList[i].LRU;
20              while(TempIndex > -1)
21              {
22                  if((CacheTable[TempIndex].CTRecInUseCount && AvoidMe != 9999)
23                      ||
24                      CacheTable[TempIndex].CTIOPendingFlag
25                      ||
26                      CacheTable[TempIndex].CTInErrorFlag)
27                  {
28                      ;
29                      else if(CacheTable[TempIndex].CTRecUpdatedFlag)
30                      /* Is Updated and Not In Use and Not I/O Started,
31                         So Start An I/O */
32                      {
33                      }
34                      /* Wait for any prior I/O to complete for the device I want
35                         to write the selected buffer for re-use to.  This should
```

APPENDIX C

```
always be
36              clear when I get here, but better safe than sorry. */
37
38              DosRequestMutexSem(ODIODoneMutexLock[i],
39                  SEM_INDEFINITE_WAIT);/*-323-*/
40
41              DosWaitEventSem(ODIODoneLock[i],SEM_INDEFINITE_WAIT);
42              DosResetEventSem(ODIODoneLock[i],&PostCountPtr);
43
44              DosReleaseMutexSem(ODIODoneMutexLock[i]);/*-323-*/
45
46              /* Set up the I/O Packet for the OD selected here. */
47              SetUpIOPkt(TempIndex,physWrite,0);/*-338-*/
48
49              /* Let 'er rip! */
50
51              DosPostEventSem(ODIODoItLock[i]);
52              break;
53          }
54          TempIndex=ODUpdatedList[i].Entry[TempIndex].Prior;/* try next one up*/
55      }/* while Temp Index > -1 */
56      }/* avoid me test */
57  }/* for each disk */
58  DosReleaseMutexSem(ODLinkLock);/*-338-*/
59  }
```

© Southwestern Bell Technology Resources, Inc. 1992-1994

APPENDIX D

```
1   void LinkUpdatedODList (INT CT,INT OD)/*260-*/
2   {
3   UINT i;
4       if(ODUpdatedList[OD].MRU == CT)
5       {
6           return;/* already there */
7       }
8
9       UnLinkUpdatedODList(CT,OD);/* in case it was linked, no longer is */
10
11      /* my next is the old MRU item */
12      ODUpdatedList[OD].Entry[CT].Next=
13          ODUpdatedList[OD].MRU;
14
15      /* if there was an old MRU, set it's prior to me */
16      if(ODUpdatedList[OD].MRU != -1)
17          ODUpdatedList[OD].Entry(ODUpdatedList[OD].MRU].Prior=CT;
18
19      /* make me the MRU */
20      ODUpdatedList[OD].MRU=CT;
21
22      ODUpdatedList[OD].Entry[CT].Prior=-1;  /* I have no prior */
23
24      /* was there an LRU already?  If not, make it me */
25      if(ODUpdatedList[OD].LRU == -1)
26          ODUpdatedList[OD].LRU=CT;
27
28      CacheTable[CT].ODUpdatedListLoc=CT; /* not -2 since is on list */
29  }
```

© Southwestern Bell Technology Resources, Inc. 1992-1994

APPENDIX E

```
1   void UnlinkUpdatedODList (INT CT,INT OD)/*260-*/
2   {
3     INT HoldPrior;
4     INT HoldNext;
5
6     if(CacheTable[CT].ODUpdatedListLoc == -2)
7
8       return; /* was not in the list to begin with, cannot remove it*/
9     }
10    /* If in list, is at CT location */
11
12    HoldPrior=ODUpdatedList[OD].Entry[CT].Prior;
13    HoldNext=ODUpdatedList[OD].Entry[CT].Next;
14
15    if(HoldNext != -1) /* do I have a next? */
16    {
17      /* yes, I have a next */
18      if(HoldPrior != -1) /* do I have a prior? */
19      {
20        /* yes, I have a prior */
21        /* HAVE PRIOR AND NEXT */
22
23        /* set my prior's next to my next */
24        ODUpdatedList[OD].Entry[HoldPrior].Next=HoldNext;
25        /* set my next's prior to my prior */
26        ODUpdatedList[OD].Entry[HoldNext].Prior=HoldPrior;
27      }
28      else /* HAVE NEXT BUT NO PRIOR */
29      {
30        /* set my next's prior to none */
31        ODUpdatedList[OD].Entry[HoldNext].Prior=-1;
32        /* set MRU to my next */
33        ODUpdatedList[OD].MRU=HoldNext;
34      }
35    }
```

© Southwestern Bell Technology Resources, Inc. 1992-1994

APPENDIX E

```
36      else /* no next */
37      {
38          if(HoldPrior != -1) /* do I have a prior? */
39          {
40              /* yes, I have a prior */
41              /* HAVE PRIOR AND NO NEXT */
42
43              /* set my prior's next to none */
44              ODUpdatedList[OD].Entry[HoldPrior].Next=-1;
45              /* set LRU to my prior */
46              ODUpdatedList[OD].LRU=HoldPrior;
47          }
48          else
49          {
50              /* NO PRIOR AND NO NEXT */
51              /* set LRU and MRU to -1 as the chain is empty */
52              ODUpdatedList[OD].LRU=ODUpdatedList[OD].MRU=-1;
53          }
54      }
55      CacheTable[CT].ODUpdatedListLoc=
56          -2;/* signal out of the chain for now */
57
58      if(CT<0 || CT>=MaxNumCacheBuffers)
59      {/*-332-*/
60          TDWindow("Invalid Cache Table number in unlink of I/O
entry.","LogWindow");
61          printf("\nInvalid Cache Table number in unlink of I/O entry.");
62          printf("\n CT=%d OD=%d",CT,OD);
63          TempHandle=LogStart();
64          fprintf(TempHandle,"Invalid Cache Table number in unlink of"
65                      " I/O entry.");
66          fprintf(TempHandle,"\n CT=%d OD=%d",CT,OD);
67          LogStop();
68          SendMessage(161,0,0);
69          ShutDownRoutine(0);/* shut down and restart */
70      }
```

APPENDIX E

```
71      ODUpdatedList[OD].Entry[CT].Prior=-1;/*-283-*/
72      ODUpdatedList[OD].Entry[CT].Next=-1;/*-283-*/
73    )
```

© Southwestern Bell Technology Resources, Inc. 1992-1994

APPENDIX F

```
1  struct UnUpdatedTableEntryStruct
2  {
3      INT    Prior;
4                          /* Link to prior UnUpdated entry. Shows -1 if none
5                             prior to this.  Shows -2 if this entry is not in the
6                             UnUpdated list.
7                          *//*-258-*/
8      INT    Next;
9                          /* Link to next UnUpdated entry. Shows -1 if none
10                            next after this.  Shows -2 if this entry is not in the
11                            UnUpdated list.
12                         *//*-258-*/
13 };
14 struct UnUpdatedTableStruct
15 {
16     struct UnUpdatedTableEntryStruct Entry[MaxNumCacheBuffers];
17                         /* Indexed by cache table entry, tells state in UnUpdated Table
18                            for destage entries to use.*/
19
20     INT    MRU;
21                         /* Destage Table Entry of the Most Recently Used UnUpdated
22                            Destage Table Entry
23                         *//*-258-*/
24     INT    LRU;
25                         /* Destage Table Entry of the Least Recently Used UnUpdated
26                            Destage Table Entry
27                         *//*-258-*/
28     INT    NumItems;
29                         /* Number of items in the UnUpdated lists
30                         *//*-258-*/
31     ULONG  Lock;
32                         /* Lock while messing with chain.
33                         *//*-260A-*/
34 };
35 struct ODUpdatedListEntryStruct/*-260-*/
```

APPENDIX F

```
36    {
37        INT Prior;
38             /* Prior entry's entry number or -1.
39             */
40        INT Next;
41             /* Next entry's entry number or -1.
42             */
43    };
44    struct ODUpdatedListsStruct/*-260-*/
45    {
46        struct ODUpdatedListsEntryStruct Entry[MaxNumCacheBuffers];
47             /* Holds a Prior and Next Entry
48             */
49        INT LRU;
50             /* Least Recently Used item in this list or -1.
51             */
52        INT MRU;
53             /* Least Recently Used item in this list or -1.
54             */
55    };
56    struct UnUpdatedTableStruct UnUpdatedTable;/*-260A-*/
57    struct ODUpdatedListStruct ODUpdatedList[NumODs];/*-260-*/
```

APPENDIX G

```
1   void TossUnUpdatedTItem(void)
2
3   /* I have the easy part of this feat.  Look for the LRU UnUpdated
4      CT entry in the bottom half of the chain, holding on to the LRU
5      Updated item, if any, in case I don't find something here.
6      Out of kindness, return the index where I was when I left off
7      as a starting point for the next guy in case I did not find
8      an LRUUpdated item. */
9
10  {
11      INT     LRUUpdatedItem;
12      INT     TempIndex;/* Chain item to look at Next */
13      INT i;
14      /* MyHashIndexReal is set BUT HASH ENTRY IS NOT POPULATED.
15      Hash Table is Locked
16      Destage Table is Locked*/
17      MyDTIndex=-1;/* in case not found, this is the clue*/
18
19      DosRequestMutexSem(UnUpdatedTable.Lock,SEM_INDEFINITE_WAIT);/*-338-*/
20
21
22      TempIndex=UnUpdatedTable.LRU;/* least recently used un-updated
23                                       cache table entry */
24      i=max(0,UnUpdatedTable.NumItems-Config.Calc.ReadSearch);
25                /* preserve the designated percent of cache as not updated records */.
26      while(i-- > 0)/* for this many at most */
27      {
28          if(TempIndex==-1)
29          {
30              DosReleaseMutexSem(UnUpdatedTable.Lock);/*-338-*/
31              return;/*end of the rope, nothing left*/
32          }
33
34          if(TempIndex == -2)/*-334-*/
35          {
```

© Southwestern Bell Technology Resources, Inc. 1992-1994

APPENDIX G

```
36      TDWindow("Invalid TempIndex (-2) in Cache removing UnUpdated
item.",LogWindow);
37      printf("\nInvalid TempIndex (-2) in Cache removing UnUpdated item.");
38      printf("\n UnUpdatedTable.LRU=%d",UnUpdatedTable.LRU);
39      TempHandle=LogStart();
40      fprintf(TempHandle,"Invalid TempIndex (-2) in Cache removing UnUpdated
item.");
41      fprintf(TempHandle,"\n UnUpdatedTable.LRU=%d",UnUpdatedTable.LRU);
42      LogStop();
43      SendMessage(166,0,0);
44      DosReleaseMutexSem(UnUpdatedTable.Lock);/*-338-*/
45      ShutDownRoutine(0);/* shut down and restart */
46      }
47
48
49
50      if(HashTable.HTEntry[DestageTable.DTEntry[TempIndex].DTHashTableIndex].
HTCTIndex==-1)
51      {
52
53      MyDTIndex=TempIndex;/* was not in use, so use it */
54      DosReleaseMutexSem(UnUpdatedTable.Lock);/*-338-*/
55      return;
56      }
57      if(
58      CacheTable[HashTable.HTEntry[DestageTable.DTEntry[TempIndex].
DTHashTableIndex].HTCTIndex].CTRecInUseCount
59                    ||
60      CacheTable[HashTable.HTEntry[DestageTable.DTEntry[TempIndex].
DTHashTableIndex].HTCTIndex].CTIOPendingFlag
61                    ||
62      CacheTable[HashTable.HTEntry[DestageTable.DTEntry[TempIndex].
DTHashTableIndex].HTCTIndex].CTInErrorFlag
63                    ||
64      CacheTable[HashTable.HTEntry[DestageTable.DTEntry[TempIndex].
DTHashTableIndex].HTCTIndex].CTRecUpdatedFlag
65      )
66
67
68
69
```

© Southwestern Bell Technology Resources, Inc. 1992-1994

APPENDIX G

```
70        ;/* skip it */
71   else
72   {
73        MyDTIndex=TempIndex;/* looks usable to me */
74        DosReleaseMutexSem(UnUpdatedTable.Lock);/*-338-*/
75        return;
76   }
77   TempIndex=UnUpdatedTable.Entry[TempIndex].Prior;/*try next*/
78   }/* while...*/
79   DosReleaseMutexSem(UnUpdatedTable.Lock);/*-338-*/
80   return;/* no find, MyDTIndex still set to -1 as a good clue of this */
81   }
```

© Southwestern Bell Technology Resources, Inc. 1992-1994

APPENDIX II

```
1   void LinkUnUpdatedAtMRU (INT Num)/*258-*/
2   {
3       UINT i;
4
5       DosRequestMutexSem(UnUpdatedTable.Lock,SEM_INDEFINITE_WAIT);/*-260A-*/
6       if(Num<0 || Num>=Config.File.Cache_Num_Buffers)/*-339-*/
7       {/*-332-*/
8           TDWindow("Invalid Cache Table number in link of updated entry.",LogWindow);
9           printf("\nInvalid Cache table number in link of updated entry.");
10          printf("\n Num=%d",Num);
11          TempHandle=LogStart();
12          fprintf(TempHandle,"Invalid Cache Table number in link of"
13              " updated entry.");
14          fprintf(TempHandle,"\n Num=%d",Num);
15          LogStop();
16          DosReleaseMutexSem(UnUpdatedTable.Lock);/*-333-*/
17          SendMessage(160,0,0);
18          ShutDownRoutine(0);/* shut down and restart */
19      }
20
21      if(UnUpdatedTable.MRU == Num)
22      {
23          DosReleaseMutexSem(UnUpdatedTable.Lock);/*-333-*/
24          return;/* already there */
25      }
26
27      UnLinkUnUpdated(Num,1);/* in case it was linked, no longer is */
28
29      UnUpdatedTable.NumItems++;
30
31      if(UnUpdatedTable.NumItems > Config.File.Cache_Num_Buffers)
32          Write_Window("NUM ITEMS UN UPDATED > Num Entries in CM",LogWindow);
33
34      /* my next is the old MRU item */
35      UnUpdatedTable.Entry[Num].Next=UnUpdatedTable.MRU;
```

© Southwestern Bell Technology Resources, Inc. 1992-1994

APPENDIX H

```
36
37   /* if there was an old MRU, set it's prior to me */
38   if(UnUpdatedTable.MRU != -1)
39      UnUpdatedTable.Entry[UnUpdatedTable.MRU].Prior=
40         Num;
41
42   /* make me the MRU */
43   UnUpdatedTable.MRU=Num;
44
45   UnUpdatedTable.Entry[Num].Prior=-1; /* I have no prior */
46
47   /* was there an LRU already?  If not, make it me */
48   if(UnUpdatedTable.LRU == -1)
49   {
50      UnUpdatedTable.LRU=Num;
51
52      if(Num == -2)/*-334-*/
53      {
54         TDWindow("Invalid UnUpdatedTable LRU (-2) in Cache adding link.",LogWindow);
55         printf("\nInvalid UnUpdatedTable LRU (-2) in Cache adding link.");
56         TempHandle=LogStart();
57         fprintf(TempHandle,"Invalid UnUpdatedTable LRU (-2) in Cache adding
link.");
58         LogStop();
59         SendMessage(165,0,0);
60.        ShutDownRoutine(0);/* shut down and restart */
61      }
62   }
63   DosReleaseMutexSem(UnUpdatedTable.lock);/*-260A-*/
64 )
```

© Southwestern Bell Technology Resources, Inc. 1992-1994

APPENDIX I

```
1   void UnLinkUnUpdated (INT Num,INT Flag)/*258-*/
2   {
3     INT HoldPrior;
4     INT HoldNext;
5     UINT i;
6
7
8     if(!Flag)
9     {
10      DosRequestMutexSem(UnUpdatedTable.Lock,SEM_INDEFINITE_WAIT);/*-260A-*/
11    }
12    if(UnUpdatedTable.Entry[Num].Prior == -2)
13    {
14      if(!Flag)
15        DosReleaseMutexSem(UnUpdatedTable.Lock);/*-260A-*/
16      return; /* was not in the list to begin with, cannot remove it*/
17    }
18
19    UnUpdatedTable.NumItems--;
20
21    if(UnUpdatedTable.NumItems < 0)
22    {/*-332-*/
23      TDWindow("Invalid count of unupdated items in cache.",LogWindow);
24      printf("\nInvalid count of unupdated items in cache.");
25      printf("\n NumItems=%d",UnUpdatedTable.NumItems);
26      TempHandle=LogStart();
27      fprintf(TempHandle," Invalid count of unupdated items in cache.");
28      fprintf(TempHandle,"\n NumItems=%d",UnUpdatedTable.NumItems);
29      LogStop();
30      SendMessage(158,0,0);
31      ShutDownRoutine(0);/* shut down and restart */
32    }
33    HoldPrior=UnUpdatedTable.Entry[Num].Prior;
34    HoldNext=UnUpdatedTable.Entry[Num].Next;
```

© Southwestern Bell Technology Resources, Inc. 1992-1994

APPENDIX I

```
36
37   if(HoldNext != -1) /* do I have a next? */
38   {
39     /* yes, I have a next */
40     if(HoldPrior != -1) /* do I have a prior? */
41     {
42       /* yes, I have a prior */
43       /* HAVE PRIOR AND NEXT */
44
45       /* set my prior's next to my next */
46       UnUpdatedTable.Entry[HoldPrior].Next=HoldNext;
47       /* set my next's prior to my prior */
48       UnUpdatedTable.Entry[HoldNext].Prior=HoldPrior;
49     }
50     else /* HAVE NEXT BUT NO PRIOR */
51     {
52       /* set my next's prior to none */
53       UnUpdatedTable.Entry[HoldNext].Prior=-1;
54       /* set MRU to my next */
55       UnUpdatedTable.MRU=HoldNext;
56     }
57   }
58   else /* no next */
59   {
60     if(HoldPrior != -1) /* do I have a prior? */
61     {
62       /* yes, I have a prior */
63       /* HAVE PRIOR AND NO NEXT */
64
65       /* set my prior's next to none */
66       UnUpdatedTable.Entry[HoldPrior].Next=-1;
67       /* set LRU to my prior */
68       UnUpdatedTable.LRU=HoldPrior;
69       if(HoldPrior == -2)/*-334-*/
70       {
71         TDWindow("Invalid UnUpdatedTable LRU (-2) in Cache removing
```

© Southwestern Bell Technology Resources, Inc. 1992-1994

APPENDIX I

```
72      link.",LogWindow);
73      link.");
74
75
76      removing link.");
77          fprintf(TempHandle,"\n HoldNext=%d",HoldNext);
78          LogStop();
79          SendMessage(164,0,0);
80          fprintf(TempHandle,"Invalid UnUpdatedTable LRU (-2) in Cache
81      ShutDownRoutine(0);/* shut down and restart */
82          printf("\nInvalid UnUpdatedTable LRU (-2) in Cache removing
83          TempHandle=LogStart();
84          printf("\n HoldNext=%d",HoldNext);
85
86      /* NO PRIOR AND NO NEXT */
87      /* set LRU and MRU to -1 as the chain is empty */
88      UnUpdatedTable.LRU=
89          -1;
90          UnUpdatedTable.MRU=
91      }
92      else
93      {
94      }
95      }/*-332-*/
96      if(Num<0 || Num>=Config.File.Cache_Num_Buffers)/*-339-*/
97          TDWindow("Invalid Cache Table number in unlink of unupdated
98  entry.",LogWindow);
99          printf("\nInvalid Cache table number in unlink of unupdated entry.");
100         printf("\n Num=%d Flag=%d",Num,Flag);
101         TempHandle=LogStart();
102         fprintf(TempHandle,"\n Num=%d Flag=%d",Num,Flag);
103         fprintf(TempHandle,"Invalid Cache table number in unlink of
        unupdated entry.");
        fprintf(TempHandle,"\n Num=%d Flag=%d",Num,Flag);
        LogStop();
        if(!Flag)/*-333-*/
        DosReleaseMutexSem(UnUpdatedTable.Lock);/*-333-*/
        SendMessage(159,0,0);
```

© Southwestern Bell Technology Resources, Inc. 1992-1994

APPENDIX I

```
104         ShutDownRoutine(0);/* shut down and restart */
105     )
106     UnUpdatedTable.Entry[Num].Prior=
107         UnUpdatedTable.Entry[Num].Next=
108         -2;/* signal out of the chain for now */
109     if(!Flag)
110         DosReleaseMutexSem(UnUpdatedTable.Lock);/*-260A-*/
111
112
113 }
```

© Southwestern Bell Technology Resources, Inc. 1992-1994

APPENDIX J

```
1  void IdleDetectionThread (void * arg)/*-203-*/
2  {
3  static ULONG Hold1=0;
4  static ULONG Hold2=0;/*-323-*/
5
6  static UINT OriginalMirrorDelay;
7  static UINT OriginalMinDST;
8  static UINT OriginalMaxDST;
9  UINT i,j;/*-291-*/
10 /*-305-UCHAR String[80];*//*-291-*/
11 /*-305-UINT ErrorCount;*//*-291-*/
12 APIRET rc;/*-291-*/
13 extern ULONG DEBUG_COUNTER_1;
14 extern ULONG ChCmdCount[MaxNumChanConfig];/*-305-*/
15 /*-305-UINT DevHangCount;*/ /*-300-*/
16
17 OriginalMirrorDelay=Config.File.Mirror_Rebuild_Delay;
18 OriginalMinDST=Config.File.Cache_Min_Dynamic_Sleep_Time;
19 OriginalMaxDST=Config.File.Cache_Max_Dynamic_Sleep_Sec;
20 DosSetPrty(PRTYS_THREAD,PRTYC_IDLETIME,(SHORT)20,0);
21
22 LoopEr:
23 if(Config.File.Cache_Tuning >= 1)/*-340-*/
24   {
25   Hold1=DEBUG_COUNTER_1;/*-323-*/
26   Hold2=DataHookCalls;/*-323-*/
27   DosSleep(3000);
28   if(DEBUG_COUNTER_1 != Hold1 || DataHookCalls != Hold2)/*-323-*/
29     {
30     Config.File.Mirror_Rebuild_Delay=OriginalMirrorDelay;
31     Config.File.Cache_Min_Dynamic_Sleep_Time=OriginalMinDST;
32     Config.File.Cache_Max_Dynamic_Sleep_Sec=OriginalMaxDST;
33     }
34   else /* no new commands received in 3 seconds */
35     {
```

© Southwestern Bell Technology Resources, Inc. 1992-1994

APPENDIX J

```
36      Config.File.Mirror_Rebuild_Delay=0;
37      if(CacheControl.CCUpdatedCacheRecordCount)
38      {
39          Config.File.Cache_Min_Dynamic_Sleep_Time=0;
40          Config.File.Cache_Max_Dynamic_Sleep_Sec=0;
41
42
43
44
45      else
46      {
47          Config.File.Cache_Min_Dynamic_Sleep_Time=OriginalMinDST;
48          Config.File.Cache_Max_Dynamic_Sleep_Sec=OriginalMaxDST;
49      }
50  }
51  else
52  {
53      Config.File.Mirror_Rebuild_Delay=OriginalMirrorDelay;
54      Config.File.Cache_Min_Dynamic_Sleep_Time=OriginalMinDST;
55      Config.File.Cache_Max_Dynamic_Sleep_Sec=OriginalMaxDST;
56      DosSleep(10000);
57  }
58
59
60  if(ShutDownFlag)
61  {
62      TDWindow("Idle Detection Thread returning.",MiscWindow);
63      DosExit(EXIT_THREAD,0);
64      return;
65  }
66  #ifndef SIMCHAN
67  /*-305-* hung channel count detection */
68  CheckForHungChannels();/*-305-*/
69  #endif
70
71
```

© Southwestern Bell Technology Resources, Inc. 1992-1994
Page 2

```
72
73    )    goto LoopEr;
```

APPENDIX J

What is claimed is:

1. A data processing system comprising:

a processor that operates on various data, said processor comprising means for specifying a source block address that corresponds to a requested data block located within a memory to be accessed by said processor;

a hierarchical memory system comprising a cache and long-term storage;

linear mapping means for linearly mapping source block addresses to virtual linear target disks equal in size to actual physical disks comprised by said long-term storage, so that each data block requested by said processor is identified by a virtual linear target disk address, including an assigned linear target disk and a linear target disk offset within an assigned linear target disk, said source block addresses identifying requested data blocks according to a source addressing scheme of said processor; and disk meshing means for assigning blocks of the virtual linear target disks, mapped by said mapping means from said source block address to said virtual linear target disk address, to disk-meshed disks equal in size to the actual physical disks comprised by said long-term storage, wherein each said requested data block is assigned to one disk-meshed disk, and requested data blocks having adjacent source block addresses are assigned to different disk-meshed disks, wherein said disk meshing means comprises means for dividing said virtual linear target disks into sets of N linear target disks, and means for meshing the source block addresses of each said virtual linear target disk within a particular virtual linear target disk set into N separate meshed disks.

2. The data processing system according to claim 1, further comprising controller meshing means for assigning each disk-meshed disk to a controller-meshed disk which will comprise the actual physical disk, wherein respective sets of blocks within respective disk-meshed disks all having the same disk controller are assigned to equal-sized controller-meshed disks located on different disk controllers.

3. The data processing system according to claim 1, wherein said disk meshing means further comprises:

means for calculating a remainder of (a number of said requested data blocks per actual physical disk)/N;

template generating means for dividing a total number of said requested data blocks per actual physical disk, substantially as evenly as possible, into a set of N meshed disk chunk sizes which comprise sizes of a disk-meshed disk which will be needed to collectively hold all of said total number of said requested data blocks per actual physical disk; and means for assigning, for each said virtual linear target disk, chunk sizes that correspond to each disk-meshed disk within a set of N meshed disks to which requested data blocks of the virtual linear target disk may be meshed, so that all requested data blocks of all virtual linear target disks have a space, defined as part of a chunk size, within a disk-meshed disk in said set of N meshed disks, wherein N represents a disk mesh factor of said disk meshing means.

4. The data processing system according to claim 1, further comprising means for utilizing assignment information of said disk meshing means, said utilizing means translating a source block address into a physical target disk address, if necessary, during I/O control of said hierarchical memory system.

5. The data processing system according to claim 1, further comprising means for dividing the total number of target disks into two target disk subsets, said linear mapping means comprising means for linearly mapping source block addresses to virtual linear target disks, equal in size to the actual physical disks comprised by said long-term storage and equal in number to ½ of the actual physical disks comprised by said long-term storage, said data processing system further comprising means for performing RAID 1 disk mirroring.

6. The data processing system according to claim 1, further comprising a storage control processor comprising means for providing processor access to said requested data block within said cache, means for transferring data between a processor memory and said cache, and means for transferring data between said cache and said long-term storage, said storage control processor comprising a mainframe storage controller.

7. In a data processing system comprising a processor that operates on various data and specifies a source block address that corresponds to a requested data block located within a memory to be accessed by the processor, and a hierarchical memory system comprising a cache and a long-term storage, a storage control method comprising:

linearly mapping source block addresses to virtual linear target disks equal in size to actual physical disks comprised by the long-term storage, so that each data block requested by the processor is identified by a virtual linear target disk address, including an assigned linear target disk and a linear target disk offset within the assigned linear target disk, said source block addresses identifying requested data blocks according to a source addressing scheme of said processor;

performing disk meshing by assigning blocks of the virtual linear target disks to disk-meshed disks equal in size to the actual physical disks comprised by the long-term storage, wherein each said requested data block is assigned to one disk-meshed disk, and source blocks having adjacent source block addresses are assigned to a different disk-meshed disk and dividing said virtual linear target disks into sets of N linear target disks; and meshing the source block addresses of each said virtual linear target disk within a particular virtual linear target disk set into N separate meshed disks, wherein N represents a disk mesh factor utilized in performing disk meshing.

\* \* \* \* \*

UNITED STATES PATENT AND TRADEMARK OFFICE
CERTIFICATE OF CORRECTION

PATENT NO. : 5,671,385
DATED : September 23, 1997
INVENTOR(S) : Larry JOST

It is certified that error appears in the above-indentified patent and that said Letters Patent is hereby corrected as shown below:

On the cover page of the printed patent, item [56] References Cited, line 8, change "4,811,203   3/1989   Hamstra" to ---4,811,203   5/1989   Hamstra---.

Signed and Sealed this

First Day of June, 1999

Attest:

Q. TODD DICKINSON

Attesting Officer

Acting Commissioner of Patents and Trademarks